United States Patent
Ogino et al.

(10) Patent No.: US 12,345,329 B2
(45) Date of Patent: Jul. 1, 2025

(54) SHIFT DEVICE

(71) Applicant: AISIN CORPORATION, Kariya (JP)

(72) Inventors: Atsuto Ogino, Kariya (JP); Kota Ishikawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/553,913

(22) PCT Filed: Mar. 3, 2022

(86) PCT No.: PCT/JP2022/009130
§ 371 (c)(1),
(2) Date: Oct. 4, 2023

(87) PCT Pub. No.: WO2022/219958
PCT Pub. Date: Oct. 20, 2022

(65) Prior Publication Data
US 2025/0012356 A1    Jan. 9, 2025

(30) Foreign Application Priority Data

Apr. 12, 2021 (JP) .................................. 2021-066926

(51) Int. Cl.
*F16H 61/32* (2006.01)
*F16H 63/38* (2006.01)

(52) U.S. Cl.
CPC ............. *F16H 61/32* (2013.01); *F16H 63/38* (2013.01); *F16H 2061/326* (2013.01)

(58) Field of Classification Search
CPC ................. F16H 59/08; F16H 61/0204; F16H 2061/326; F16H 2061/0225; F16H 2061/0087
See application file for complete search history.

(56) References Cited

U.S. PATENT DOCUMENTS 8,707,817 B2 * 4/2014 Itazu ................... F16H 63/3466
74/473.12
9,951,866 B2 * 4/2018 Kuwahara ............... F16H 61/28
(Continued)

FOREIGN PATENT DOCUMENTS

JP    2005-69406 A    3/2005
JP    2021-38834 A    3/2021

OTHER PUBLICATIONS

International Search Report Issued Apr. 26, 2022, in PCT/JP2022/009130, filed on Mar. 3, 2022, 2 pages.

*Primary Examiner* — Bobby Rushing, Jr.
(74) *Attorney, Agent, or Firm* — Oblon, McClelland, Maier & Neustadt, L.L.P.

(57) ABSTRACT

A shift device includes a shift switching member including a plurality of valley portions; a positioning member configured to establish a shift position; a motor configured to drive the shift switching member; a rotor rotation angle sensor; and an output shaft rotation angle sensor configured to detect a rotation angle of the shift switching member. When the positioning member is moved to pass through the plurality of valley portions, the rotation angle of the motor corresponding to the valley bottom of each of the plurality of valley portions is acquired by, based on output values of the rotor rotation angle sensor and the output shaft rotation angle sensor, and a design value associated with the output value of the output shaft rotation angle sensor and the shift positions, detecting the valley bottom at an end portion among the valley portions and reversing the movement of the positioning member.

5 Claims, 7 Drawing Sheets

(56) References Cited

U.S. PATENT DOCUMENTS

| | | | |
|---|---|---|---|
| 10,138,999 B2* | 11/2018 | Yamada | F16H 61/32 |
| 2005/0174084 A1* | 8/2005 | Nakai | F16H 61/32 |
| | | | 318/632 |
| 2006/0103339 A1* | 5/2006 | Yamada | G05B 5/01 |
| | | | 318/623 |
| 2007/0046243 A1* | 3/2007 | Hori | F16H 61/32 |
| | | | 318/630 |
| 2008/0168853 A1 | 7/2008 | Amamiya et al. | |
| 2020/0325986 A1* | 10/2020 | Sakaguchi | F16H 63/3408 |
| 2021/0071757 A1 | 3/2021 | Ogino et al. | |

* cited by examiner

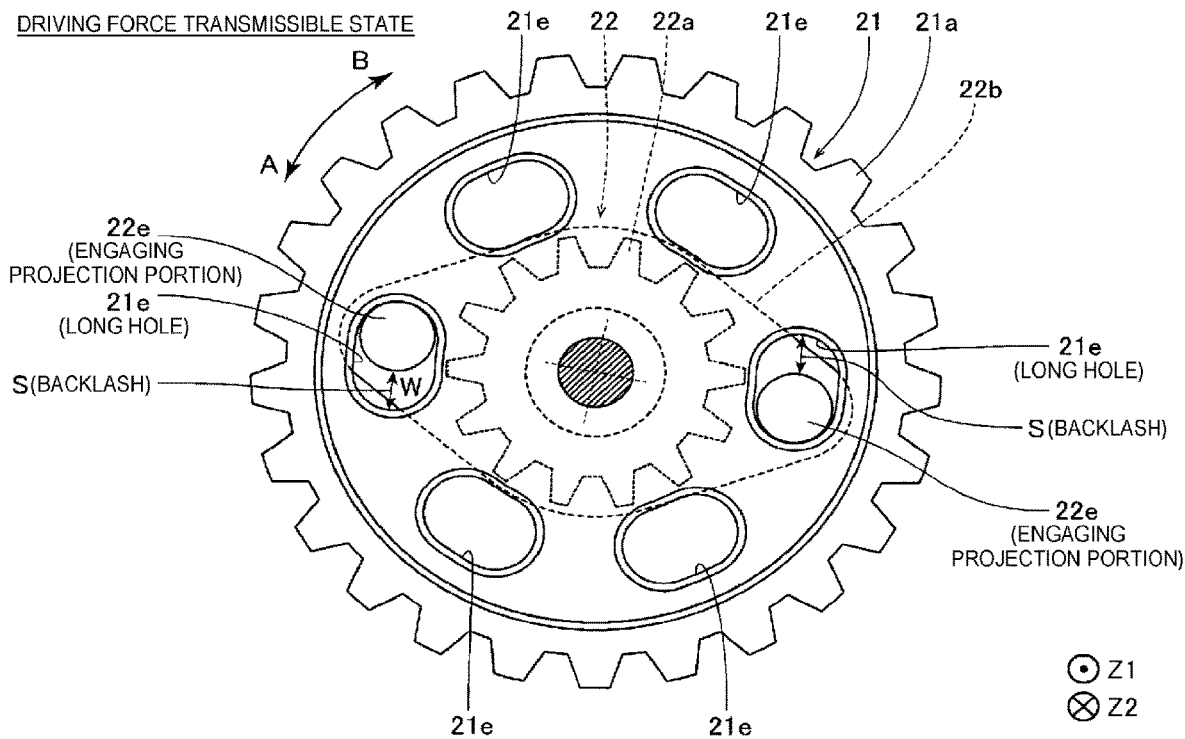
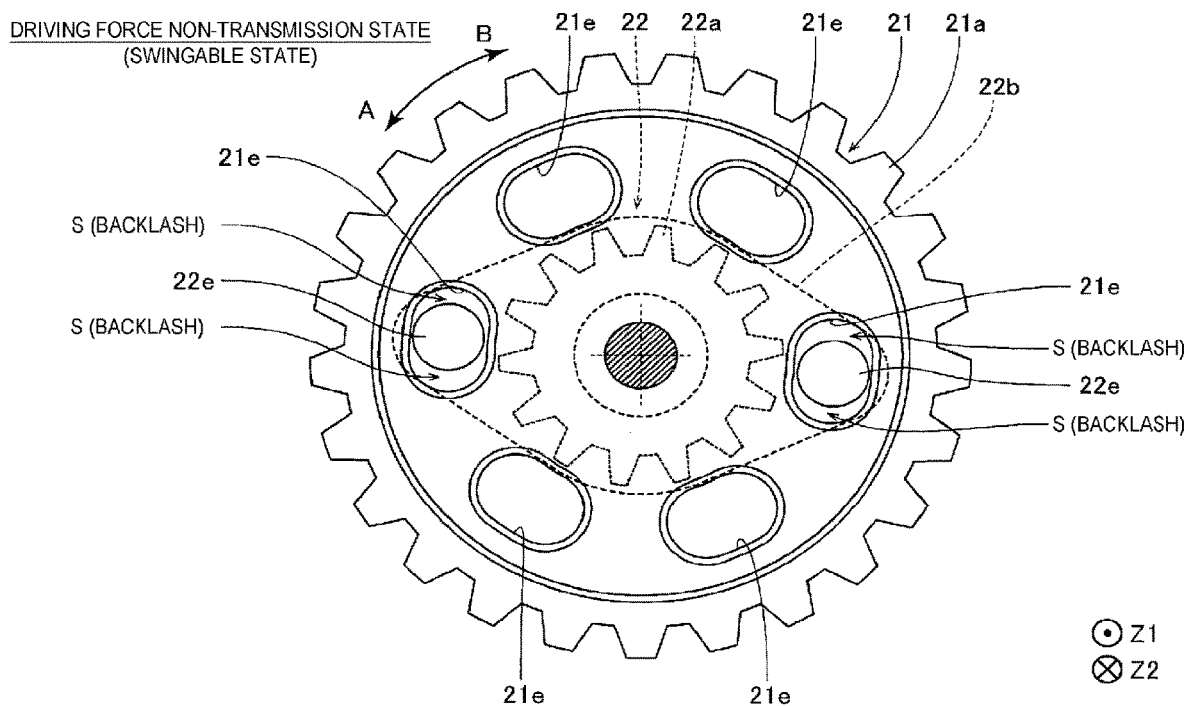

FIG. 9
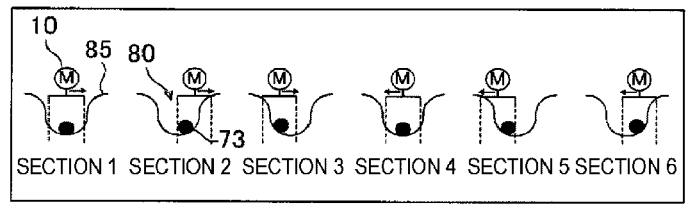
FIG. 10
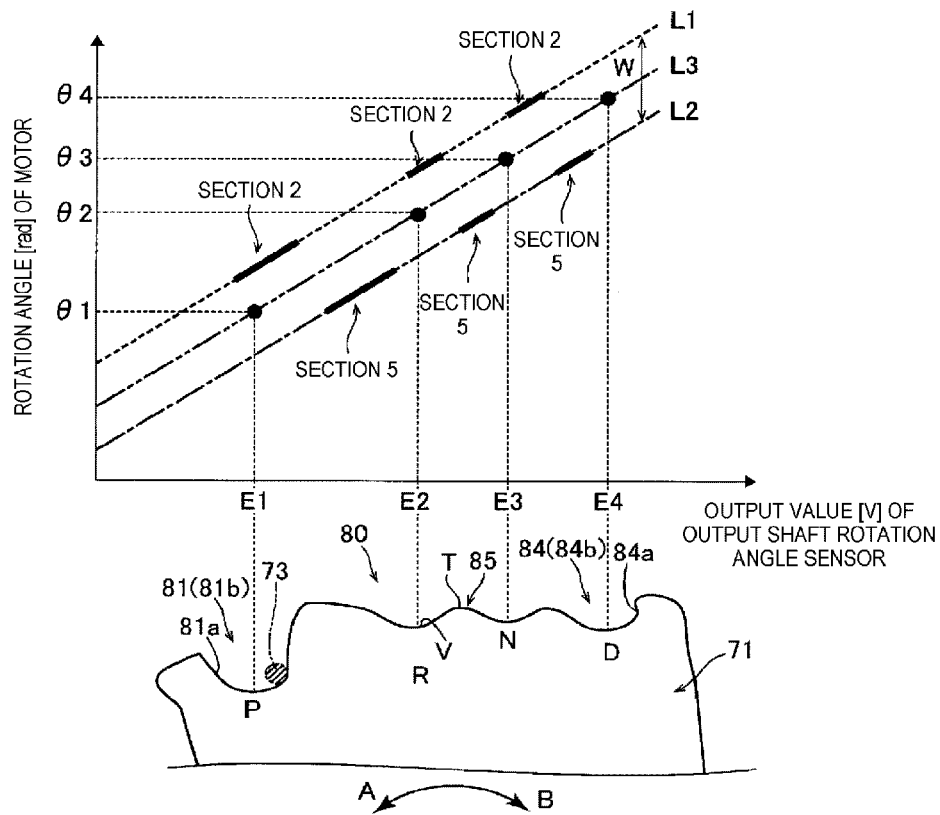
FIG. 11
| ROTATION ANGLE OF DETENT PLATE (OUTPUT SHAFT) | OUTPUT VALUE OF OUTPUT SHAFT ROTATION ANGLE SENSOR | SHIFT POSITION |
|---|---|---|
| a1~a2 [DEGREE] | A1~A2 [V] | P POSITION |
| b1~b2 [DEGREE] | B1~B2 [V] | R POSITION |
| c1~c2 [DEGREE] | C1~C2 [V] | N POSITION |
| d1~d2 [DEGREE] | D1~D2 [V] | D POSITION |
|  | OUT OF RANGES OF OUTPUT VALUE DESCRIBED ABOVE | SHIFT-UNFIXED POSITION |

SHIFT DEVICE

TECHNICAL FIELD

This disclosure relates to a shift device to be mounted on a vehicle.

BACKGROUND ART

In the related art, a shift device to be mounted on a vehicle is known. Such a shift device is disclosed in, for example, JP2005-69406A.

JP2005-69406A discloses a shift range switching device (a shift switching device) that includes an actuator, which includes a motor that operates based on a control signal corresponding to a shift operation of an occupant, and a shift switching mechanism that switches a shift position when being driven by the actuator. The shift switching mechanism includes a detent plate (a shift switching member) and a detent spring (a positioning member) provided with a roller (a pin) at a tip thereof. The detent plate is a plate including a plurality of valley portions corresponding to shift positions. The detent spring establishes one of the shift positions in a state where the roller at the tip is fitted in any one of the plurality of valley portions of the detent plate. Further, since the detent plate is fixed to an output shaft of the actuator, the detent plate is turned integrally with the output shaft of the actuator. The detent plate (the shift switching member) is mechanically connected to a transmission mechanism that performs a shift switching operation.

According to JP2005-69406A, the actuator rotates based on a control signal from a control unit corresponding to an operation on an operation unit performed by the occupant, and the rotation of the actuator is transmitted to the output shaft. Further, since the detent plate is turned together with the output shaft, the roller at the tip of the detent spring located at one of the valley portions of the detent plate moves to another valley portion. Therefore, the shift position is switched. In addition, a wall portion having an inclination angle, at which the roller at the tip of the detent spring cannot move over the wall portion, is provided in the valley portion at an end portion among the plurality of valley portions of the detent plate.

Further, in the shift range switching device disclosed in JP2005-69406A, in order to improve the positioning accuracy of the roller at the tip of the detent spring with respect to the detent plate, a position of a valley bottom of the valley portion into which the roller at the tip of the detent spring is fitted is acquired (learned) in advance. As a result of the learning, when the vehicle is actually driven, a drive control on the detent plate is performed to prevent the roller at the tip of the detent spring from strongly colliding against the wall portion.

In the learning performed by the shift range switching device (the shift switching device) disclosed in JP2005-69406A, there is a step of intentionally bringing the roller at the tip of the detent spring (the positioning member) into contact with (colliding against) the wall portion, pressing the roller at the tip of the detent spring against the wall portion while the roller at the tip being in contact with the wall portion, and bending a main body of the detent spring provided with the roller at the tip, thereby acquiring a position of the wall portion.

CITATION LIST

Patent Literature

PTL 1: JP2005-69406A

However, in the shift range switching device described in JP2005-69406A, at the time of learning, it is necessary to bring the roller (the pin) at the tip of the detent spring (the positioning member) into contact with (colliding against) the wall portion, press the roller against the wall portion, and bend the main body of the detent spring provided with the roller at the tip, and a load is applied to the transmission mechanism mechanically connected to the detent plate (the shift switching member), so that there is a problem that durability of the transmission mechanism is decreased.

This disclosure is made to solve the above problem, and an object of this disclosure is to provide a shift device that can suppress a decrease in durability of a transmission mechanism mechanically connected to a shift switching member, and can suppress a decrease in the positioning accuracy of a shift position.

SUMMARY OF INVENTION

Solution to Problem

In order to achieve the above object, a shift device according to a first aspect of the invention is a shift device to be mounted on a vehicle, the shift device including: a shift switching member including a plurality of valley portions provided to correspond to shift positions; a positioning member configured to, in a state of being fitted in any one of the plurality of valley portions of the shift switching member, establish a corresponding one of the shift positions; a motor configured to drive the shift switching member and including a rotor and a stator; a rotor rotation angle sensor configured to detect a rotation angle of the rotor; and an output shaft rotation angle sensor configured to detect a rotation angle of the shift switching member, in which when the positioning member is moved to pass through the plurality of valley portions, the rotation angle of the motor corresponding to a valley bottom of each of the plurality of valley portions is acquired by, based on output values of the rotor rotation angle sensor and the output shaft rotation angle sensor, and a design value associated with the output value of the output shaft rotation angle sensor and the shift positions, detecting the valley bottom of the valley portion at an end portion among the plurality of valley portions and reversing the movement of the positioning member.

In the shift device according to the first aspect of the invention, as described above, when the positioning member is moved to pass through the plurality of valley portions, the rotation angle of the motor corresponding to the valley bottom of each of the plurality of valley portions is acquired (learned) by, based on the output values of the rotor rotation angle sensor and the output shaft rotation angle sensor, and the design value associated with the output value of the output shaft rotation angle sensor and the shift positions, detecting the valley bottom of the valley portion at the end portion among the plurality of valley portions and reversing the movement of the positioning member. Accordingly, at the time of learning, based on the output values of the rotor rotation angle sensor and the output shaft rotation angle sensor and the design value associated with the output value of the output shaft rotation angle sensor and the shift positions, the valley bottom of the valley portion (the valley portion provided with a wall portion) at the end portion among the plurality of valley portions can be detected, and the movement of the positioning member can be reversed. Therefore, when the valley bottom of the valley portion (the valley portion provided with the wall portion) at the end portion is detected, a moving direction of the positioning member can be changed such that the positioning member moves away from the wall portion. As a result, the learning can be performed without causing the positioning member to collide with the wall portion provided at the valley portion at the end portion. Therefore, it is possible to suppress a decrease in durability of a transmission mechanism mechanically connected to the shift switching member, and it is possible to suppress a decrease in the positioning accuracy of the shift position.

In the shift device according to the first aspect, it is preferable that the shift device further includes a speed reduction mechanism in which a predetermined amount of backlash is provided which does not allow transmission of a driving force from the motor to the shift switching member, the speed reduction mechanism being configured to turn the shift switching member while reducing a rotation speed transmitted from a motor side, and the rotation angle of the motor corresponding to the valley bottom of each of the plurality of valley portions is acquired by detecting the valley bottom of the valley portion at the end portion and reversing the movement of the positioning member by detecting a state, where the driving force is not transmitted from the motor to the shift switching member due to the backlash, based on the output values of the rotor rotation angle sensor and the output shaft rotation angle sensor and the design value.

According to such a configuration, it is possible to keep the positioning member at the valley bottom of the valley portion of the shift switching member without moving the shift switching member with respect to the driving of the motor by a distance corresponding to the predetermined amount of backlash (play) intentionally provided in the speed reduction mechanism. Therefore, it is possible to learn a position of the valley bottom of the valley portion to which a positioning portion is fitted, without applying an excessive load (an external force) to the motor side or a positioning member side.

In the shift device according to the first aspect, it is preferable that the rotation angle of the motor corresponding to the valley bottom of each of the plurality of valley portions is acquired by reciprocating the positioning member once between the end portions on both sides among the valley portions.

According to such a configuration, since it is possible to acquire (learn) the rotation angle of the motor corresponding to the valley bottom of each of the plurality of valley portions by simply reciprocating the positioning member once between the end portions on both sides among the plurality of valley portions, a tact time for acquiring the rotation angle of the motor corresponding to the valley bottom of each of the plurality of valley portions can be shortened.

In this case, it is preferable that, when the positioning member is moved to pass through the plurality of valley portions, in a case where, after driving of the motor is started, the valley bottom of the valley portion, which is the valley bottom of the valley portion detected at the start of the driving of the motor and which is in the same rotation direction as that at the start of the driving of the motor, is detected again based on the output values of the rotor rotation angle sensor and the output shaft rotation angle sensor and the design value, it is determined that the rotation angle of the motor corresponding to the valley bottom of each of the plurality of valley portions is acquired, and the driving of the motor is stopped.

According to such a configuration, since the driving of the motor can be stopped in a case where the valley bottom of the valley portion, which is the valley bottom of the valley portion detected at the start of the driving of the motor and which is in the same rotation direction as that at the start of the driving of the motor, is detected again after the driving of the motor is started, it is possible to reliably detect that the positioning member is reciprocated once between the end portions on both sides among the plurality of valley portions.

In the shift device according to the first aspect, it is preferable that the plurality of valley portions include a parking position, a reverse position, a neutral position, and a drive position as the shift positions in order of the parking position, the reverse position, the neutral position and the drive position from one end portion toward the other end portion, and the rotation angle of the motor corresponding to each of the parking position, the reverse position, the neutral position, and the drive position is acquired while the positioning member is being moved to pass through the parking position, the reverse position, the neutral position, and the drive position in order.

According to such a configuration, it is possible to reverse the movement of the positioning member at the parking position and the drive position located at the end portions, and to acquire (learn) the rotation angle of the motor corresponding to each of the parking position, the reverse position, the neutral position, and the drive position.

In this case, it is preferable that at another position of the shift switching member excluding the four shift positions including the parking position, the reverse position, the neutral position, and the drive position, it is detected that the positioning member is located at a shift-unfixed position at which the design value is not associated with the output value of the output shaft rotation angle sensor.

According to such a configuration, it is possible to detect not only that the positioning member is located at any one of the parking position, the reverse position, the neutral position, and the drive position, but also that the positioning member is located at a position (the shift-unfixed position) that does not correspond to all of the four shift positions including the parking position, the reverse position, the neutral position, and the drive position. As a result, since a position of the positioning member can be detected in more detail, it is possible to acquire (learn) the rotation angle of the motor corresponding to the shift position more accurately.

A shift device according to a second aspect of the invention is a shift device to be mounted on a vehicle, the shift device including: a shift switching member including a plurality of valley portions provided to correspond to shift positions; a positioning member configured to, in a state of being fitted in any one of the plurality of valley portions of the shift switching member, establish a corresponding one of the shift positions; a motor configured to drive the shift switching member and including a rotor and a stator; a rotor rotation angle sensor configured to detect a rotation angle of the rotor; and an output shaft rotation angle sensor configured to detect a rotation angle of the shift switching member, in which when the positioning member is moved to pass through the plurality of valley portions, the rotation angle of the motor corresponding to a valley bottom of each of the plurality of valley portions is acquired by reciprocating the positioning member between end portions on both sides among the plurality of valley portions based on output values of the rotor rotation angle sensor and the output shaft rotation angle sensor, and a design value associated with the output value of the output shaft rotation angle sensor and the shift positions.

In the shift device according to the second aspect of the invention, as described above, when the positioning member is moved to pass through the plurality of valley portions, the rotation angle of the motor corresponding to the valley bottom of each of the plurality of valley portions is acquired by reciprocating the positioning member between the end portions at both sides among the plurality of valley portions based on the output values of the rotor rotation angle sensor and the output shaft rotation angle sensor, and the design value associated with the output value of the output shaft rotation angle sensor and the shift positions. Accordingly, at the time of learning, the rotation angle of the motor corresponding to the valley bottom of each of the plurality of valley portions is acquired by reciprocating the positioning member between the end portions at both sides among the plurality of valley portions based on the output values of the rotor rotation angle sensor and the output shaft rotation angle sensor, and the design value associated with the output value of the output shaft rotation angle sensor and the shift positions. As a result, the learning can be performed without causing the positioning member to collide with the wall portion provided at the end portion. Therefore, it is possible to suppress the decrease in the durability of the transmission mechanism mechanically connected to the shift switching member, and it is possible to suppress the decrease in the positioning accuracy of the shift position. In addition, since it is not necessary to detect the valley bottoms of the valley portions at the end portions on both sides, the tact time can be shortened.

In the present application, the shift device according to the first aspect described above may have the following configuration.

(Additional Note 1)

That is, in the shift device according to the first aspect, the wall portion for preventing the positioning member from moving beyond the valley portion at the end portion is provided at the valley portion at the end portion, and the movement of the positioning member is reversed such that the positioning member does not collide with the wall portion.

According to such a configuration, since the movement of the positioning member can be reversed such that the positioning member does not collide with the wall portion, it is possible to more reliably prevent the positioning member from colliding against the wall portion.

(Additional Note 2)

In the shift device according to the first aspect, the design value includes an angle map that indicates a relation between the shift position and the rotation angle of the shift switching member corresponding to the output value of the output shaft rotation angle sensor.

According to such a configuration, it is possible to easily acquire (learn) the rotation angle of the motor corresponding to the valley bottom of each of the plurality of valley portions based on the angle map indicating the relation between the shift position and the rotation angle of the shift switching member corresponding to the output value of the output shaft rotation angle sensor.

BRIEF DESCRIPTION OF DRAWINGS

FIG. 6 is a diagram illustrating an engagement state (a driving force transmissible state) of an intermediate gear in the actuator unit constituting the shift device according to the embodiment;

FIG. 7 is a diagram illustrating an engagement state (a driving force non-transmission state) of the intermediate gear in the actuator unit constituting the shift device according to the embodiment;

FIG. 9 is a diagram illustrating a relation between a rotation shaft of the motor and the output shaft;

FIG. 10 is a diagram illustrating a relation of a first estimated value, a second estimated value, and a center of backlash in the shift device according to the embodiment;

FIG. 11 is a diagram illustrating a design value (an angle map); and

DESCRIPTION OF EMBODIMENTS

Hereinafter, an embodiment will be described with reference to the drawings.

(Overall Configuration of Shift Device)

First, a configuration of a shift device 100 according to an embodiment will be described with reference to FIGS. 1 to 12. In the description of the application, a "rotation angle of a motor" and a "rotation angle of a rotor" have the same meaning.

Figure 1:
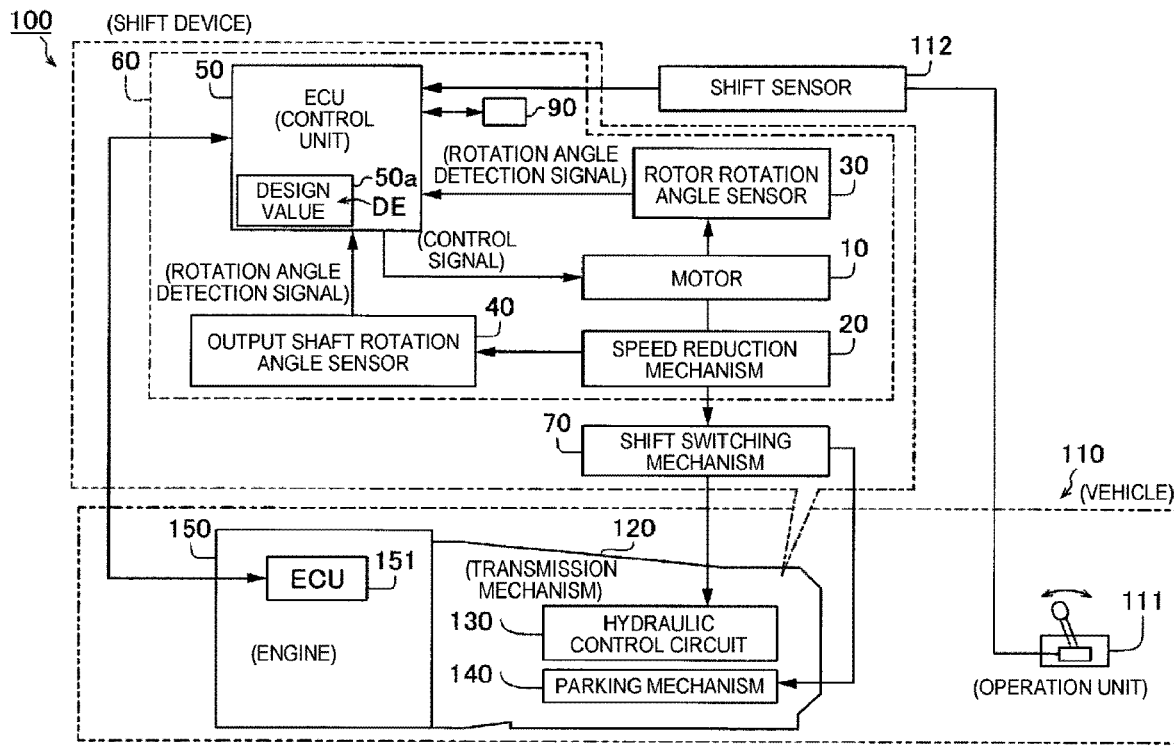
FIG. 1 is a block diagram illustrating a control configuration of a shift device according to an embodiment.

As illustrated in FIG. 1, the shift device 100 is mounted on a vehicle 110 such as an automobile. In the vehicle 110, when a driver performs a shift switching operation via an operation unit 111 such as a shift lever, electrical shift switching control is performed on a transmission mechanism 120. That is, a position of the shift lever is input to a shift device 100 side via a shift sensor 112 provided in the operation unit 111. Then, based on a control signal transmitted from a dedicated ECU 50 provided in the shift device 100, the transmission mechanism 120 is switched to any one of shift positions including a P (parking) position, an R (reverse) position, an N (neutral) position, and a D (drive) position corresponding to a shift operation of an occupant. Such shift switching control is called shift-by-wire (SBW).

The shift device 100 includes an actuator unit 60 and a shift switching mechanism 70 to be driven by the actuator unit 60.

The shift switching mechanism 70 is mechanically connected to a manual spool valve (not shown) of a hydraulic valve body in a hydraulic control circuit 130 and a parking mechanism 140 in the transmission mechanism 120. The shift position (the P position, the R position, the N position, and the D position) of the transmission mechanism 120 is mechanically switched by driving the shift switching mechanism 70.

Figure 2:
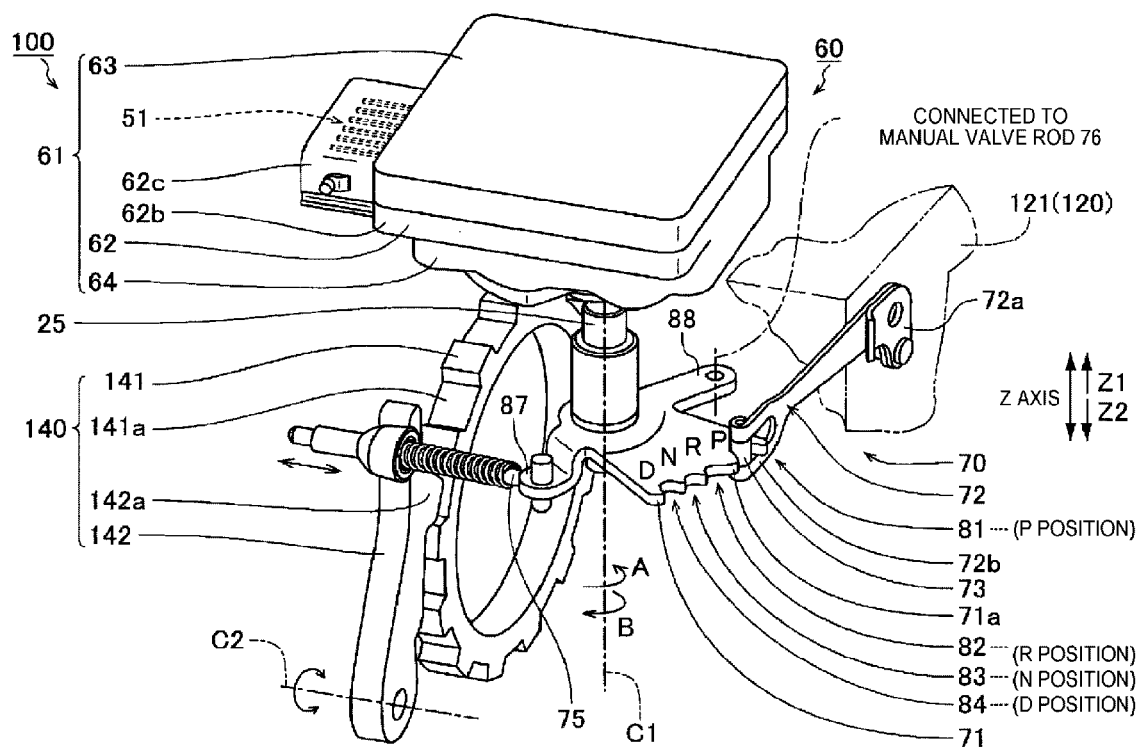
FIG. 2 is a perspective view schematically illustrating an overall configuration of the shift device according to the embodiment.

The actuator unit 60 includes a motor 10, a speed reduction mechanism 20, a rotor rotation angle sensor 30 that detects a rotation angle of a rotor 11 of the motor 10, an output shaft rotation angle sensor 40 that detects a rotation angle of a detent plate 71 (an output shaft 25), and the ECU 50. As illustrated in FIG. 2, the ECU 50 is a substrate component in which electronic components are mounted on a substrate 51. The output shaft rotation angle sensor 40 is implemented by, for example, a hall element. A rotation position (an output angle) of the output shaft 25 is detected as continuous voltage values by the output shaft rotation angle sensor 40.

Further, the actuator unit 60 includes a box-shaped main body 61 that accommodates the components of the actuator unit 60 and is fixed to a case of the transmission mechanism 120. The actuator unit 60 further includes the output shaft 25 connected to an output side of the speed reduction mechanism 20. The actuator unit 60 further includes a nonvolatile storage unit 90 provided inside the main body 61 (see FIG. 1) (the storage unit 90 is not shown in FIG. 4).

(Detailed Configuration of Shift Switching Mechanism)

As illustrated in FIG. 2, the shift switching mechanism 70 includes the detent plate 71 (an example of the "shift switching member" in Claims) and a detent spring 72 (an example of the "positioning member" in Claims). The detent spring 72 holds the detent plate 71 at one of turning angle positions respectively corresponding to the P position, the R position, the N position, and the D position.

Figure 3:
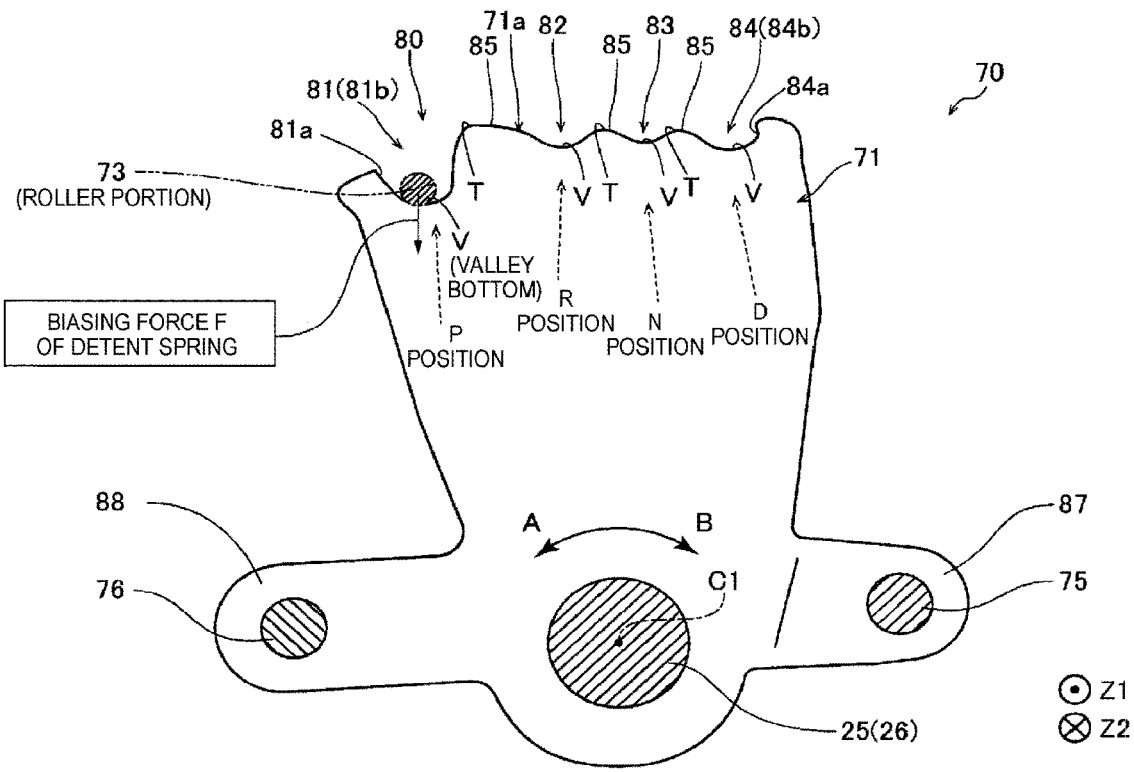
FIG. 3 is a diagram illustrating a structure of a detent plate constituting the shift device according to the embodiment.

As illustrated in FIG. 3, the detent plate 71 includes a plurality of (four) valley portions 80 (valley portions 81 to 84) provided to correspond to the shift positions (the P position, the R position, the N position, and the D position). More specifically, the plurality of (four) valley portions 81 to 84 (the valley portions 80) include the parking position, the reverse position, the neutral position, and the drive position as the shift positions in order of the parking position, the reverse position, the neutral position, and the drive position from one end portion 81b toward the other end portion 84b among the plurality of (four) valley portions 81 to 84.

Further, the shift device 100 acquires (learns) rotation angles of the motor 10 corresponding to the parking position, the reverse position, the neutral position, and the drive position while moving the detent spring 72 to pass through the parking position, the reverse position, the neutral position, and the drive position in order. The details of the learning will be described later.

In addition, at another position of the detent plate 71 excluding the four shift positions including the parking position, the reverse position, the neutral position, and the drive position, the shift device 100 detects that the detent spring 72 is located at a shift-unfixed position where a design value DE to be described later is not associated with an output value of the output shaft rotation angle sensor 40. In short, the shift-unfixed position (another position of the detent plate 71 described above) includes three positions, that is, a position (a peak portion 85) between the parking position and the reverse position, a position (the peak portion 85) between the reverse position and the neutral position, and a position (the peak portion 85) between the neutral position and the drive position.

A cam surface 71a having a continuous undulating shape is formed on the detent plate 71 due to the valley portions 81 to 84. Further, the valley portions 80 adjacent to each other (for example, the valley portion 81 and the valley portion 82, the valley portion 82 and the valley portion 83, and the like) are separated by the peak portion 85 including a top portion T. In the detent spring 72, a base end portion 72a (see FIG. 2) is fixed to a casing 121 (see FIG. 2) of the transmission mechanism 120, and a roller portion (a pin) 73 is attached on a free end 72b (see FIG. 2) side. In the detent spring 72, the roller portion 73 always presses the cam surface 71a (at a position of any one of the valley portions 81 to 84 or a position of any one of the peak portions 85). The detent spring 72 establishes one of the shift positions in a state of being fitted in any one of the plurality of valley portions 81 to 84.

As illustrated in FIG. 3, a wall portion 81a and a wall portion 84a for preventing the detent spring 72 from moving beyond the valley portion 81 arranged at the one end portion 81b and the valley portion 84 arranged at the other end portion 84b are respectively provided at the valley portion 81 and the valley portion 84 among the plurality of valley portions 80 included in the detent plate 71. Specifically, the wall portion 81a is provided at the valley portion 81 arranged at an end portion of the detent plate 71 in an arrow A direction. Further, the wall portion 84a is provided at the valley portion 84 arranged at an end portion of the detent plate 71 in an arrow B direction. The shift device 100 reverses the movement of the detent spring 72 (the driving of the motor 10) at a valley bottom V at the P position and a valley bottom V at the D position such that the detent spring 72 does not collide with the wall portions 81a and 84a.

As illustrated in FIG. 2, the detent plate 71 is fixed to a lower end portion (a Z2 side) of the output shaft 25, and the detent plate 71 is turned integrally with the output shaft 25 around a turning axis C1. Therefore, in the detent spring 72, the roller portion 73 slides along the cam surface 71a accompanying forward and reverse turning (swing) of the detent plate 71 in the arrow A direction or the arrow B direction, thus being fitted in any one of the valley portions 81 to 84 due to a biasing force F of the detent spring 72. Further, when the roller portion 73 of the detent spring 72 is selectively fitted in any one of the valley portions 81 to 84 of the detent plate 71, the detent plate 71 is held at the turning angle position corresponding to the P position, the R position, the N position, or the D position. Accordingly, the P position, the R position, the N position, or the D position is individually established.

The detent plate 71 further includes an arm portion 87 and an arm portion 88. A park rod 75 is connected to the arm portion 87, and a manual valve rod 76 (see FIG. 3) is connected to the arm portion 88. Further, when the detent plate 71 is turned to the turning angle position corresponding to the R position, the manual spool valve at a tip end of the manual valve rod 76 is moved to a position corresponding to the R position in the hydraulic valve body, and thus a hydraulic circuit for the R position is formed in the hydraulic control circuit 130 (see FIG. 1). Regarding other shift positions, similar to the R position, the manual valve rod 76 (the manual spool valve) is moved to a position corresponding to any one of the shift positions accompanying the turning of the detent plate 71, and thus a hydraulic circuit corresponding to each of the shift positions is formed in the hydraulic control circuit 130.

(Detailed Configuration of Parking Mechanism)

As illustrated in FIG. 2, the parking mechanism 140 includes a parking gear 141 connected to a crankshaft (not shown) of an engine 150, and a lock pawl 142 to be engaged with the parking gear 141. The lock pawl 142 is moved to a lock position and a non-lock position accompanying the movement of the park rod 75. When the detent plate 71 is turned to the turning angle position corresponding to the P position, the lock pawl 142 is turned to the lock position with a turning axis C2 as a turning center, and a projection portion 142*a* is engaged with a tooth bottom portion 141*a* of the parking gear 141. Accordingly, the free turning of the parking gear 141 is restricted, and the rotation of the crankshaft is restricted. When the detent plate 71 is turned to one of the turning angle positions corresponding to the shift positions (the R, N, and D positions) other than the P position, the lock pawl 142 is turned to the non-lock position, and the engagement between the lock pawl 142 and the parking gear 141 is released.

(Detailed Configuration of Actuator Unit)

Next, a detailed configuration of the actuator unit 60 will be described.

<Configuration of "Main body" of Actuator Unit>

Figure 4:
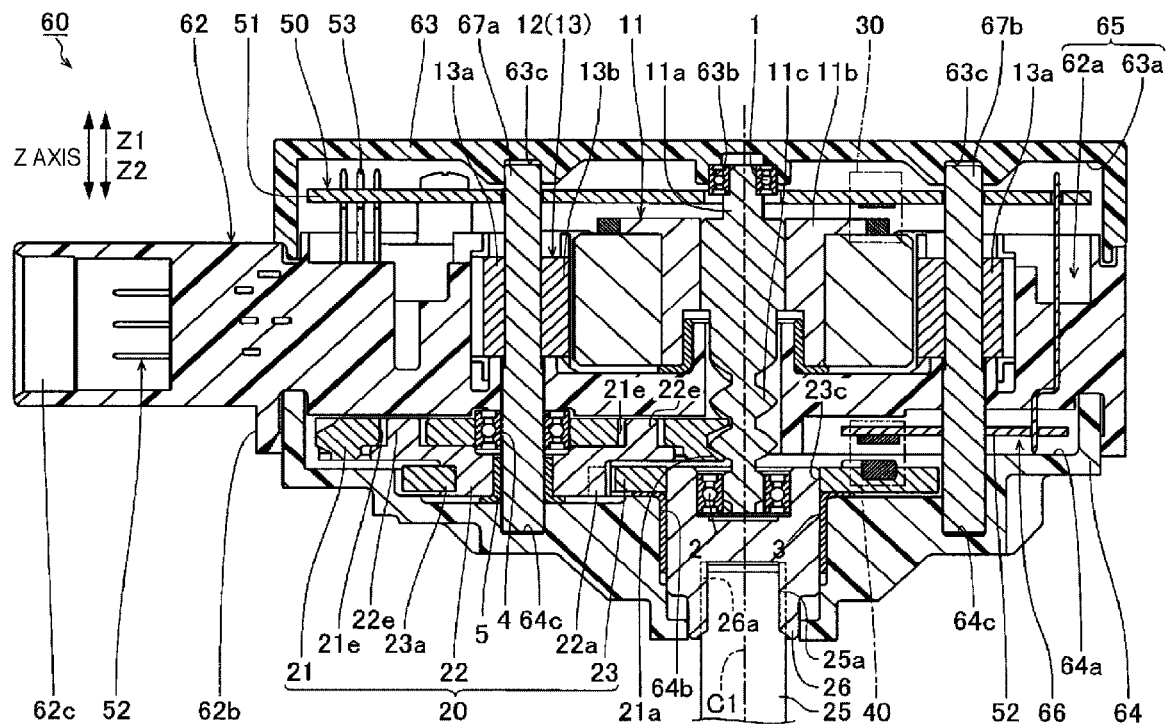
FIG. 4 is a cross-sectional view illustrating an actuator unit constituting the shift device according to the embodiment.

As illustrated in FIG. 4, the main body 61 includes a motor housing 62, a motor cover 63, and a gear housing 64. The motor housing 62 and the motor cover 63 which are both made of a resin and have heat resistance are assembled in a state where a recess portion 62*a* and a recess portion 63*a* face each other, and thus the motor 10 and the ECU 50 are accommodated in a motor chamber 65. Further, the gear housing 64 made of a resin is assembled to the motor housing 62 from an opposite side (a Z2 side) such that a recess portion 64*a* faces the motor housing 62, and thus the speed reduction mechanism 20 is accommodated in a gear chamber 66.

A socket 62*c* including a terminal 52 is formed on an outer surface 62*b* on one side of the motor housing 62. The terminal 52 is electrically connected to the ECU 50 via wiring 53. Further, electric power is supplied to the actuator unit 60 via a wiring cable (not shown) connected to the socket 62*c*. Intercommunication between the ECU 50 and an ECU 151 (see FIG. 1) that controls the engine 150 is performed via the wiring cable. The ECU 50 is electrically connected to the motor 10 (see FIG. 1), the rotor rotation angle sensor 30 (see FIG. 1), and the output shaft rotation angle sensor 40 (see FIG. 1).

<Configuration of "Motor" of Actuator Unit>

As illustrated in FIG. 4, the motor 10 includes the rotor 11 rotatably supported with respect to the motor housing 62, and a stator 12 disposed around the rotor 11 in a manner of facing the rotor 11 with a magnetic gap therebetween. Further, the motor 10 drives the detent plate 71.

As the motor 10, a surface permanent magnet (SPM) three-phase motor in which a permanent magnet is incorporated on a surface of the rotor 11 is used. Specifically, the rotor 11 includes a shaft pinion 11*a*, a rotor core 11*b*, and a gear portion 11*c*.

In the rotor 11, N pole magnets and S pole magnets as permanent magnets are alternately attached to a surface of the rotor core 11*b* at equal angle intervals (45 degrees) around the turning axis C1. Therefore, the number of poles of the motor 10 is 8.

An upper end portion (a Z1 side) of the shaft pinion 11*a* is rotatably supported by a bearing member 1 disposed in a rotation shaft support portion 63*b* of the motor cover 63, and a lower end portion (the Z2 side) is rotatably supported by a bearing member 2 in an output bearing portion 26 freely turnably supported by a bearing member 3 pressed in an output shaft support portion 64*b*. The bearing member 2 is disposed along an inner periphery of a recess portion on an upper end portion (the Z1 side) of the output bearing portion 26. Accordingly, the shaft pinion 11*a* of the rotor 11 and the output shaft 25 are rotated around the same turning axis C1.

The gear portion 11*c* is formed integrally with the shaft pinion 11*a* in an outer peripheral region from a central portion to a lower end portion (the Z2 side) of the shaft pinion 11*a*. In the gear portion 11*c*, a gear groove is formed in a helical shape.

As illustrated in FIG. 4, the stator 12 includes a stator core 13 fixed in the motor chamber 65 of the motor housing 62, and excitation coils (not shown) of multiple phases (a U phase, a V phase, and a W phase) that generate magnetism by energization.

As illustrated in FIG. 4, the stator core 13 integrally includes a substantially cylindrical main body 13*a* having the same axial center as the shaft pinion 11*a* of the rotor 11, and a plurality of (four) teeth 13*b* each protruding from an inner wall surface of the main body 13*a* toward an axial center side. Through holes are formed in parallel with the shaft pinion 11*a* respectively in a pair of teeth 13*b* among these teeth 13*b* that are opposite to each other with the axial center as a center and are arranged on both sides in a radial direction. Further, a support shaft 67*a* and a support shaft 67*b*, which have a rod shape and are inserted into through holes of the motor housing 62, pass through the through holes. Rear end portions (upper end portions in FIG. 4) of the support shaft 67*a* and the support shaft 67*b* are fitted into recess portions 63*c* of the motor cover 63, and front end portions (lower end portions in FIG. 4) are fitted into recess portions 64*c* of the gear housing 64. Accordingly, the stator 12 is fixed in the motor chamber 65. The support shaft 67*a*, the support shaft 67*b*, and the shaft pinion 11*a* are provided such that axial centers thereof are parallel to one another in a Z direction.

<Configuration of "Speed Reduction Mechanism" of Actuator Unit>

Figure 5:
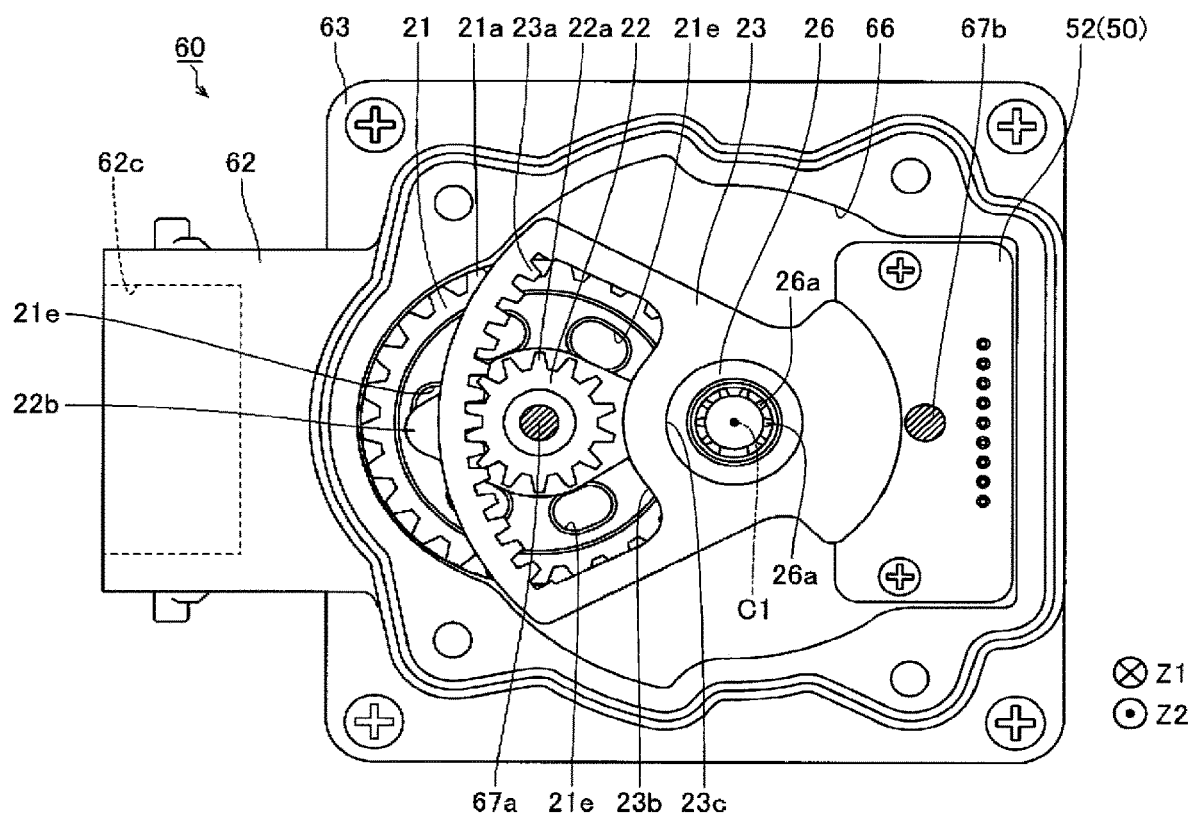
FIG. 5 is a diagram illustrating an internal structure of a speed reduction mechanism in a state where a gear housing is detached from a main body in the actuator unit constituting the shift device according to the embodiment.

The speed reduction mechanism 20 turns the detent plate 71 while reducing a rotation speed transmitted from a motor 10 side. Specifically, as illustrated in FIGS. 4 and 5, the speed reduction mechanism 20 includes the gear portion 11*c* of the rotor 11, an intermediate gear 21 having a gear portion 21*a* meshing with the gear portion 11*c*, an intermediate gear 22 disposed on a lower surface side (the Z2 side) at the same axial center as the intermediate gear 21 and engaged with the intermediate gear 21, and a final gear 23 having a gear portion 23*a* meshing with a gear portion 22*a* of the intermediate gear 22. A driving force generated by the motor 10 is transmitted to the gear portion 11*c*, the intermediate gear 21, the intermediate gear 22, and the final gear 23 in order, and finally is transmitted to the output shaft 25 via the output bearing portion 26.

The intermediate gear 21 is provided on a motor 10 side on which the detent plate 71 is driven. The intermediate gear 22 is provided on a detent plate 71 side and is turned accompanying the turning of the intermediate gear 21. The lower end portion of the shaft pinion 11*a* is supported by the bearing member 2, and thus the gear portion 11*c* crosses the gear chamber 66 in a vertical direction (the Z direction). The intermediate gear 21 is rotatably supported by a bearing member 4 with respect to the support shaft 67*a* inserted into the through hole of the motor housing 62. The intermediate gear 22 is rotatably supported by a substantially cylindrical bearing member 5 fitted into the support shaft 67*a*. The intermediate gear 21 and the intermediate gear 22 are coaxially stacked.

As illustrated in FIGS. 6 and 7, the intermediate gear 21 is provided with a plurality of (six) long holes 21*e* each having a major axis extending in a peripheral direction, between a rotation center portion and an outer peripheral portion (the gear portion 21a). The long holes 21e are arranged at an interval of 60 degrees in the peripheral direction. Further, the intermediate gear 22 includes an elliptical main body 22b on which the gear portion 22a is provided, and is provided with a plurality of (two) columnar engaging projection portions 22e protruding upward from an upper surface (the Z1 side) of the main body 22b opposite to the gear portion 22a. The engaging projection portions 22e are disposed at peripheral edge portions of the main body 22b on both sides in a major axis direction. Further, in a state where the intermediate gear 22 is disposed adjacent to the intermediate gear 21 from a lower side toward an upper side (the Z1 side), the engaging projection portions 22e arranged at an interval of 180 degrees from each other are inserted (engaged) into the corresponding two long holes 21e of the intermediate gear 21, respectively.

The engaging projection portions 22e are fitted into the long holes 21e of the intermediate gear 21 with a backlash S having a predetermined size (a length in the peripheral direction). That is, as illustrated in FIG. 7, relative free turning (free rotation) between the intermediate gear 21 and the intermediate gear 22 is allowed by an amount (a predetermined angular width) corresponding to the backlash S in a circumferential direction generated at the engaging projection portions 22e and the long holes 21e fitted into each other. In short, the backlash S is a predetermined amount of gap between the long hole 21e and the engaging projection portion 22e, which does not allow transmission of the driving force from the motor 10 to the detent plate 71.

Therefore, the intermediate gear 21 and the intermediate gear 22 are not always integrally rotated, and the rotation transmitted to the intermediate gear 21 is transmitted to the intermediate gear 22 while allowing the relative free turning (the free rotation) in one direction (the arrow A direction) or the other direction (the arrow B direction) at the predetermined angular width. FIG. 6 shows a state where the driving force can be transmitted from the intermediate gear 21 to the intermediate gear 22, and FIG. 7 shows a state where the driving force cannot be transmitted from the intermediate gear 21 to the intermediate gear 22.

Here, in the present embodiment, the shift device 100 detects, based on output values of the rotor rotation angle sensor 30 and the output shaft rotation angle sensor 40 and the design value DE (see FIGS. 1 and 11), a state where the driving force is not transmitted from the motor 10 to the detent plate 71 due to the backlash S, thereby detecting the valley bottoms V of the valley portions 81 and 84 at the end portions 81b and 84b. Further, the shift device 100 reverses the movement of the detent plate 71 so as to acquire (learn) the rotation angles of the motor 10 corresponding to the valley bottoms V of the plurality of valley portions 81 to 84. The details of the learning will be described later. Instead of detecting the valley bottoms of the valley portions at the end portions on both sides among the plurality of valley portions based on the output values of the rotor rotation angle sensor and the output shaft rotation angle sensor and the design value, the shift device may acquire the rotation angles of the motor corresponding to the valley bottoms of the plurality of valley portions by reciprocating the detent spring between the end portions on both sides among the plurality of valley portions, that is, reciprocating the detent spring by reversing a turning direction of the detent plate at positions close to the valley portions at the end portions on both sides among the plurality of valley portions (inner sides of the valley portions at the end portions on both sides among the plurality of valley portions). In this case, since it is not necessary to detect up to the valley bottoms of the valley portions at the end portions on both sides, the tact time can be shortened.

In short, when the detent plate 71 turning in the arrow B direction moves to the valley bottom V of the valley portion 81 at the end portion 81b that is provided with the wall portion 81a (when the detent spring 72 is fitted into the valley portion 81), the shift device 100 reverses the turning of the detent plate 71 (the rotation of the motor 10) in order to avoid the collision of the detent spring 72 against the wall portion 81a. Further, when the detent plate 71 turning in the arrow A direction moves to the valley bottom V of the valley portion 84 at the end portion 84b that is provided with the wall portion 84a (when the detent spring 72 is fitted into the valley portion 84), the shift device 100 reverses the turning of the detent plate 71 (the rotation of the motor 10) in order to avoid the collision of the detent spring 72 against the wall portion 84a. A flow of a control process of avoiding the collision of the detent spring 72 against the wall portions 81a and 84a will be described later.

As illustrated in FIG. 11, the design value DE described above is an angle map showing a relation between the shift position (the P position, the R position, the N position, and the D position) and the rotation angle of the detent plate 71 corresponding to the output value of the output shaft rotation angle sensor 40. In short, the shift device 100 can determine, based on the design value DE, which shift position the detent spring 72 is located while the detent plate 71 is being turned. At each of the shift positions, the output value of the output shaft rotation angle sensor 40 is kept substantially constant. Therefore, a range of the output value (a range of the voltage value) of the output shaft rotation angle sensor 40 corresponding to each of the shift positions is extremely smaller than a range of an output value (a range of a voltage value) of the output shaft rotation angle sensor 40 corresponding to the shift-unfixed position. The design value DE is stored in a storage unit 50a (see FIG. 1) included in the ECU 50 of the actuator unit 60. The design value may be stored in another storage unit such as the nonvolatile storage unit of the actuator unit.

As illustrated in FIG. 5, the gear portion 22a of the intermediate gear 22 meshes with the gear portion 23a of the fan-shaped final gear 23 incorporated to rotate integrally with the output bearing portion 26 in a state where the final gear 23 has the same turning axis C1 as the output bearing portion 26. The gear portion 23a is formed as an internal gear on an inner side along an outer peripheral edge of a substantially arc-shaped insertion hole 23b provided in the final gear 23. The gear portion 23a is formed as a gear having a diameter larger than that of the gear portion 22a. Further, in the final gear 23, the output bearing portion 26 is fixed to a fitting hole 23c having a rotation center at a position of "kaname (pivot)" of the fan shape. The speed reduction mechanism 20 decelerates the rotation of the shaft pinion 11a on an output shaft 25 side by the intermediate gear 21, the intermediate gear 22, and the final gear 23.

The speed reduction mechanism 20 has a speed reduction ratio of 1:50. That is, the output shaft 25 is rotated by one rotation when the rotor 11 is rotated by 50 rotations (the motor 10 is subjected to 24×50=1200 energization steps). Therefore, in the motor 10, the rotor 11 is rotated by 15 degrees in one energization step, and thus the output shaft 25 is rotated by 0.3 degrees (=15/50).

A plurality of vertical grooves (serrations) 26a extending in an axial direction are formed on an inner periphery of a recess portion on a lower end portion (the Z2 side) of the output bearing portion 26. A plurality of vertical groove portions (serrations) 25a extending in the axial direction are formed on an outer periphery of an upper end portion (the Z1 side) of the output shaft 25 (see FIG. 4). Therefore, the vertical groove portions 25*a* of the output shaft 25 are fitted and coupled to the vertical groove portions 26*a* of the output bearing portion 26 at an appropriate rotation angle position in a manner of allowing torque transmission. Therefore, the output shaft 25 provided with the detent plate 71 fixed to the lower end portion (the Z2 side) is assembled to the actuator unit 60 at the appropriate rotation angle position.

(Relation between Output Value of Output Shaft Rotation Angle Sensor and Output Value of Rotor Rotation Angle Sensor)

Next, a relation of the movement of the shift position, the output value of the output shaft rotation angle sensor 40 and the output value of the rotor rotation angle sensor 30 will be described.

Figure 8:
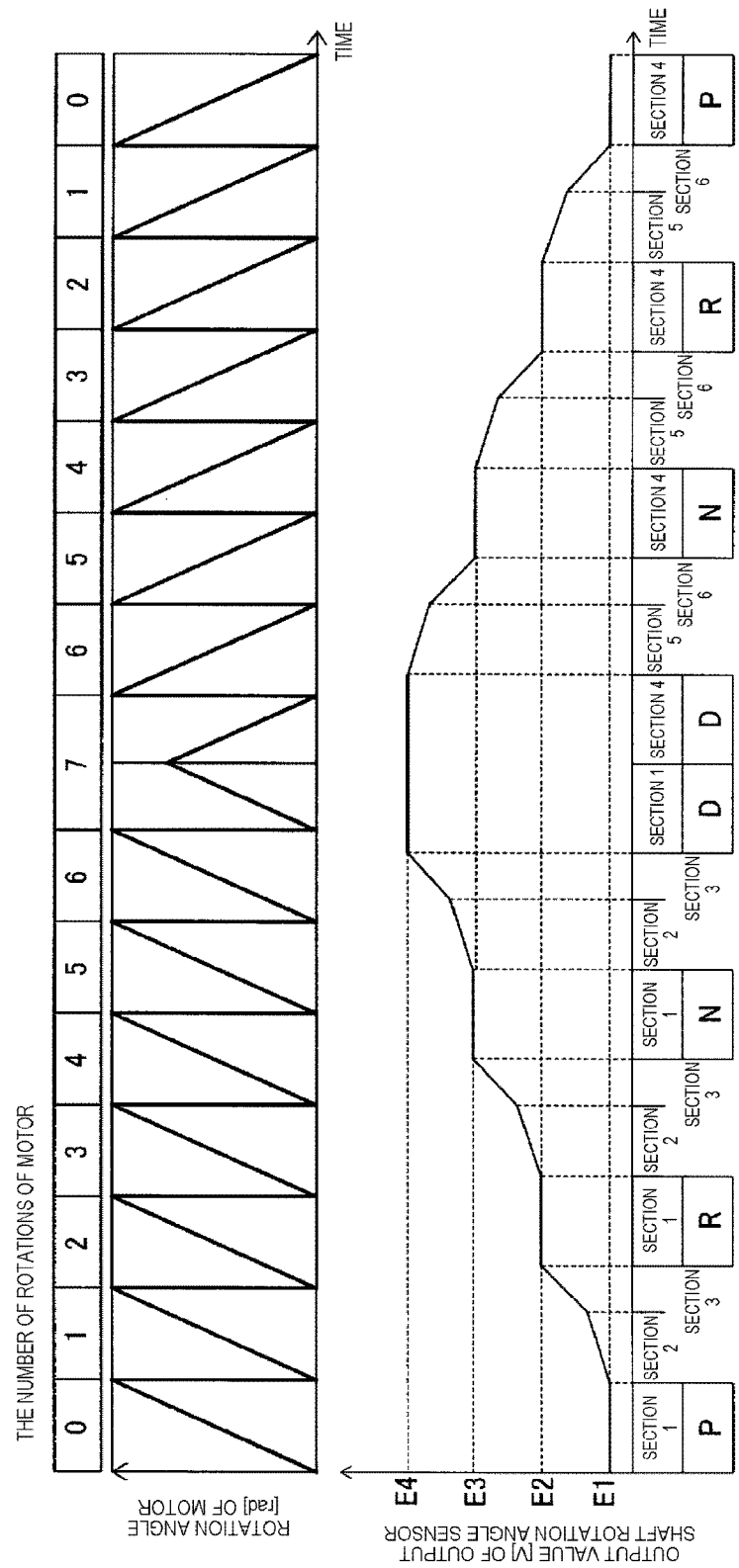
FIG. 8 is a diagram illustrating a relation of an output value (an output voltage) of an output shaft rotation angle sensor, an output value (a rotation angle of a motor) of a rotor rotation angle sensor, and the number of rotations of the motor in the shift device according to the embodiment.

As illustrated in FIG. 8, in a case where an initial position of the shift position is located at the P position, the detent plate 71 connected to the output shaft 25 turns such that the shift position changes in order of the P position, the R position, the N position, and the D position as the number of rotations of the motor 10 increases (0 rotation, one rotation, two rotations, . . . seven rotations). At this time, the detent spring 72 is fitted into each of the valley portions 80 in order of the valley portions 81 to 84. The output value of the output shaft rotation angle sensor 40 increases as the number of rotations of the motor 10 increases.

For example, it is assumed that the roller portion 73 is now fitted into the valley portion 81 (the P position) (a section 1). When the motor 10 (see FIG. 1) is driven, the detent plate 71 is turned in the arrow A direction via the speed reduction mechanism 20 (see FIG. 1). A predetermined amount of backlash S (see FIG. 7) is provided between the intermediate gear 21 and the intermediate gear 22. Therefore, in a state where the roller portion 73 is completely fitted into the valley bottom V of the valley portion 81 (see the section 1 in FIG. 9), although the intermediate gear 21 is turned together with the rotation of the rotor 11, the engaging projection portions 22*e* are engaged inside the long holes 21*e* in a manner of not allowing transmission of the driving force by using the backlash S, so that the intermediate gear 22 is not turned. As a result, in the section 1, while the rotation angle (rad) of the rotor 11 detected by the rotor rotation angle sensor 30 (see FIG. 1) increases linearly, a voltage level corresponding to the rotation angle of the output shaft 25 detected by the output shaft rotation angle sensor 40 (see FIG. 1) is constant.

Thereafter, in a section 2, one end portion of each of the long holes 21*e* of the intermediate gear 21 is engaged with a corresponding one of the engaging projection portions 22*e* of the intermediate gear 22 in a manner of allowing transmission of the driving force (see FIG. 6 and the section 2 in FIG. 9), so that the driving force generated by the motor 10 is transmitted to the output shaft 25 (see FIG. 2) via the gear portion 11*c*, the intermediate gear 21, the intermediate gear 22, and the final gear 23 (see FIG. 4). Accordingly, along with the turning of the detent plate 71 in the arrow A direction, the roller portion 73 moves to climb along an inclined surface of the valley portion 81 (the P position) on a valley portion 82 (the R position) side toward the peak portion 85. The motor 10 rotates by about one rotation at the P position (the section 1). In the section 2, the rotation angle (rad) of the rotor 11 detected by the rotor rotation angle sensor 30 (see FIG. 1) linearly increases. In addition, the voltage level corresponding to the rotation angle of the output shaft 25 detected by the output shaft rotation angle sensor 40 (see FIG. 1) increases at a constant rate. An engagement state of the intermediate gears 21 and 22 in this state corresponds to the state in FIG. 6.

In a section 3, after the roller portion 73 climbs over the peak portion 85 at a boundary between the valley portion 81 (the P position) and the valley portion 82 (the R position), the detent plate 71 is naturally turned in the arrow A direction prior to the motor 10 (the intermediate gear 21). That is, the detent plate 71 is always biased toward the valley portion 82 by the roller portion 73, so that the detent plate 71 is turned by the biasing force F (see FIG. 3) in the arrow A direction prior to the motor 10 within the range of the size of the backlash S in the long hole 21*e*. Further, the roller portion 73 is dropped toward the valley bottom V of the valley portion 82 (see the section 3 in FIG. 9). At this time, while the rotation angle of the rotor 11 increases, the voltage level corresponding to the rotation angle of the output shaft 25 rapidly increases as the roller portion 73 drops (is sucked) into the valley bottom V.

An operation for the movement of the shift position from the R position to the N position, and an operation for the movement of the shift position from the N position to the D position are similar to the operation for the movement of the shift position from the P position to the R position.

Then, a rotation direction of the motor 10 is reversed. Therefore, the shift position is moved to the N position through the D position (a section 4), a section 5, and a section 6. An operation at the D position (the section 4) is similar to the operation at the section 1. That is, while the rotation angle (rad) of the rotor 11 detected by the rotor rotation angle sensor 30 (see FIG. 1) linearly decreases, the voltage level corresponding to the rotation angle of the output shaft 25 detected by the output shaft rotation angle sensor 40 (see FIG. 1) is constant. Further, an operation in the section 5 is similar to the operation in the section 2. That is, in the section 5, the rotation angle of the rotor 11 linearly decreases, and the voltage level corresponding to the rotation angle of the output shaft 25 decreases at a constant rate. Further, an operation in the section 6 is similar to the operation in the section 3. That is, while the rotation angle of the rotor 11 decreases, the voltage level corresponding to the rotation angle of the output shaft 25 rapidly decreases as the roller portion 73 drops (is sucked) into the valley bottom V.

Here, in order to improve the positioning accuracy of the detent spring 72 with respect to the detent plate 71 (the valley bottom V of the valley portion 80), it is necessary to accurately grasp the rotation angle of the motor 10 (the rotor 11) in a state where the detent spring 72 is located at the valley bottom V of the valley portion 80. Therefore, the shift device 100 acquires (learns) the rotation angles of the motor 10 (the rotor 11) corresponding to the valley bottoms V of the plurality of valley portions 81 to 84 (the valley portions 80). Such learning performed by the shift device 100 is performed, for example, before shipment from a factory.

(Learning Operation of Shift Device)

Next, the acquisition (learning) of the rotation angles of the motor 10 (the rotor 11) corresponding to the valley bottoms V (the center of the backlash S) of the valley portions 80 at the plurality of shift positions (the P position, the R position, the N position, and the D position) will be described. The acquisition of the rotation angles of the motor 10 corresponding to the valley bottoms V is performed by, for example, the ECU 50.

In the present embodiment, as illustrated in FIG. 10, first, the detent spring 72 (the roller portion 73) is moved to continuously pass through the plurality of valley portions 80. Then, the shift device 100 acquires the rotation angles of the motor 10 corresponding to the valley bottoms V of the plurality of valley portions 81 to 84 by reciprocating the detent spring 72 once between the end portions 81*b* and 84*b* on both sides among the plurality of valley portions 81 to 84.

As a specific example, the shift device 100 starts the movement of the detent spring 72 (the detent plate 71) (the driving of the motor 10) from the N position to the P position. When the detent spring 72 reaches the P position, the shift device 100 reverses the movement of the detent spring 72 (the detent plate 71) (the driving of the motor 10) from the P position to the D position. When the detent spring 72 reaches the D position, the shift device 100 reverses the movement of the detent spring 72 (the detent plate 71) (the driving of the motor 10) from the D position to the P position. When the detent spring 72 reaches the N position again, the shift device 100 stops the movement of the detent spring 72 (the detent plate 71) (the driving of the motor 10).

Here, in order to stop the driving of the motor 10, when the detent spring 72 is moved to pass through the plurality of valley portions 81 to 84, in a case where, after the driving of the motor 10 is started, the valley bottom V (the N position) of the valley portion 83, which is the valley bottom V (the N position) of the valley portion 83 detected at the start of the driving of the motor 10 and which is in the same rotation direction (the arrow B direction) as that at the start of the driving of the motor 10, is detected again based on the output values of the rotor rotation angle sensor 30 and the output shaft rotation angle sensor 40 and the design value DE, the shift device 100 determines that the rotation angles of the motor 10 corresponding to the valley bottoms of the plurality of valley portions 81 to 84 are acquired, and stops the driving of the motor 10.

The shift device 100 detects a width of the backlash S included in the speed reduction mechanism 20 based on the output value of the output shaft rotation angle sensor 40 and the output value of the rotor rotation angle sensor 30 while the detent spring 72 is being moved. The output value of the output shaft rotation angle sensor 40 is a voltage (V). Further, the output value of the rotor rotation angle sensor 30 is a rotation angle (rad). The detected output value of the output shaft rotation angle sensor 40 and the detected output value of the rotor rotation angle sensor 30 are indicated by thick lines in FIG. 10.

The shift device 100 continuously move the detent spring 72 between the P position and the D position. The word "continuously" means that when the detent spring 72 moves between the P position and the D position (between the one end portion 81*b* and the other end portion 84*b*), the detent spring 72 moves without being reversed in the middle. The detent spring 72 is reciprocated once through the plurality of valley portions 80 of the detent plate 71 by continuously moving.

Then, the output value of the output shaft rotation angle sensor 40 and the output value of the rotor rotation angle sensor 30, which are detected when the detent spring 72 turns in the arrow A direction (when the detent spring 72 moves in a direction from the P position toward the D position), are indicated by thick lines on a straight line L1 in FIG. 10.

Further, the output value of the output shaft rotation angle sensor 40 and the output value of the rotor rotation angle sensor 30, which are detected when the detent spring 72 turns in the arrow B direction (when the detent spring 72 moves in a direction from the D position toward the P position), are indicated by thick lines on a straight line L2 in FIG. 10.

Then, in the present embodiment, the width of the backlash S included in the speed reduction mechanism 20 is detected based on the output value of the output shaft rotation angle sensor 40 and the output value of the rotor rotation angle sensor 30 in a movement section where the detent spring 72 moves from the valley bottom V of the valley portion 80 to the top portion T of the peak portion 85 of the detent plate 71. As illustrated in FIG. 6, the width of the backlash S means a width W between the engaging projection portion 22*e* and the long hole 21*e* in a state where the backlash S is eliminated (a state where the driving force can be transmitted from the intermediate gear 21 to the intermediate gear 22).

As illustrated in FIG. 9, the movement section (the section 2 and the section 5) where the detent spring 72 moves from the valley bottom V of the valley portion 80 to the top portion T of the peak portion 85 of the detent plate 71 is a section where the backlash S between the intermediate gear 21 and the intermediate gear 22 is eliminated (see FIG. 6) and the intermediate gear 22 turns accompanying the turning of the intermediate gear 21. The movement section where the detent spring 72 moves from the valley bottom V to the top portion T includes the section 2 when the detent plate 71 is turned in the arrow A direction, and the section 5 when the detent plate 71 is turned in the arrow B direction.

In the present embodiment, as illustrated in FIG. 10, the width of the backlash S is detected based on the output values of the output shaft rotation angle sensor 40 and the output values of the rotor rotation angle sensor 30 in the movement section when the motor 10 is rotated in the arrow A direction (an example of the first direction in Claims) and when the motor 10 is rotated in the arrow B direction (an example of the second direction in Claims) opposite to the arrow A direction.

Specifically, as described above, the width of the backlash S is detected based on the output values of the output shaft rotation angle sensor 40 and the output values of the rotor rotation angle sensor 30 in the section 2 in a state where the backlash S is eliminated when the motor 10 is rotated in the arrow A direction and the section 5 in a state where the backlash S is eliminated when the motor 10 is rotated in the arrow B direction. The section 2 includes the section 2 when the detent spring 72 moves from the P position to the R position, the section 2 when the detent spring 72 moves from the R position to the N position, and the section 2 when the detent spring 72 moves from the N position to the D position. The section 5 includes the section 5 when the detent spring 72 moves from the D position to the N position, the section 5 when the detent spring 72 moves from the N position to the R position, and the section 5 when the detent spring 72 moves from the R position to the P position.

<Calculation of First Estimated Value (Straight Line L1)>

The calculation of a first estimated value (the straight line L1) will be described. In the present embodiment, the first estimated value (the straight line L1) of the rotor rotation angle sensor 30 with respect to the output value of the output shaft rotation angle sensor 40 is calculated based on the output values of the output shaft rotation angle sensor 40 and the output values of the rotor rotation angle sensor 30 in a plurality of movement sections when the motor 10 is rotated in the arrow A direction.

Specifically, the first estimated value is calculated based on the output values of the output shaft rotation angle sensor 40 and the output values of the rotor rotation angle sensor 30 in three sections 2 (the section 2 when the detent spring 72 moves from the P position to the R position, the section 2 when the detent spring 72 moves from the R position to the N position, and the section 2 when the detent spring 72 moves from the N position to the D position) when the motor 10 is rotated in the arrow A direction. The three sections 2 are sections when the roller portion 73 moves toward the top portion T to climb over the peak portion 85 (see FIG. 3).

Specifically, in the present embodiment, the first estimated value is calculated by linearly approximating the output values of the rotor rotation angle sensor 30 with respect to the output values of the output shaft rotation angle sensor 40 in a plurality of movement sections (the three sections 2, the thick lines on the straight line L1 in FIG. 10) when the motor 10 is rotated in the arrow A direction. That is, a horizontal axis represents the output value (the voltage) of the output shaft rotation angle sensor 40, a vertical axis represents the output value (the rotation angle) of the rotor rotation angle sensor 30, and a relation between the voltages (V) and the rotation angles (rad) in the three sections 2 is linearly approximated. Accordingly, the straight line L1 is acquired as the first estimated value. That is, a slope (hereinafter referred to as a1) and segments (hereinafter referred to as b1) of the straight line L1 are calculated. Actually, the vertical axis represents an integrated value of the rotation angle of the motor 10 (that is, $2\pi \times$ the number of rotations of the motor 10+the rotation angle).

<Calculation of Second Estimated Value (Straight Line L2)>

The calculation of a second estimated value (the straight line L2) will be described. In the present embodiment, the second estimated value (the straight line L2) of the rotor rotation angle sensor 30 with respect to the output value of the output shaft rotation angle sensor 40 is calculated based on the output values of the output shaft rotation angle sensor 40 and the output values of the rotor rotation angle sensor 30 in a plurality of movement sections when the motor 10 is rotated in the arrow B direction.

Specifically, the second estimated value is calculated based on the output values of the output shaft rotation angle sensor 40 and the output values of the rotor rotation angle sensor 30 in three sections 5 (the section 5 when the detent spring 72 moves from the D position to the N position, the section 5 when the detent spring 72 moves from the N position to the R position, and the section 5 when the detent spring 72 moves from the R position to the P position) when the motor 10 is rotated in the arrow B direction. The three sections 5 are sections when the roller portion 73 moves toward the top portion T to climb over the peak portion 85 (see FIG. 3).

Specifically, in the present embodiment, the second estimated value is calculated by linearly approximating the output values of the rotor rotation angle sensor 30 with respect to the output values of the output shaft rotation angle sensor 40 in a plurality of movement sections (the three sections 5) when the motor 10 is rotated in the arrow B direction. That is, the horizontal axis represents the output value (the voltage) of the output shaft rotation angle sensor 40, and the vertical axis represents the output value (the rotation angle) of the rotor rotation angle sensor 30, and a relation between the voltages (V) and the rotation angles (rad) in the three sections 5 is linearly approximated. Accordingly, the straight line L2 is acquired as the second estimated value. That is, a slope (hereinafter referred to as a2) and segments (hereinafter referred to as b2) of the straight line L2 are calculated.

<Difference Between First Estimated Value and Second Estimated Value is Detected as Width W of Backlash>

Then, a difference between the first estimated value and the second estimated value is detected as the width of the backlash S, and a value at a center of the width of the backlash S is set as a center of the backlash S. The width of the backlash S is a width (see FIG. 6) of the predetermined amount of backlash S provided in advance between the intermediate gear 21 and the intermediate gear 22. Specifically, the width W between the first estimated value (the straight line L1) calculated by linear approximation and the second estimated value (the straight line L2) calculated by linear approximation is detected as the width of the backlash S. That is, since the predetermined amount of backlash S is provided in advance between the intermediate gear 21 and the intermediate gear 22, a difference in the rotation angle (the vertical axis) of the motor 10 is generated even using the same output value of the output shaft rotation angle sensor 40 (the horizontal axis). Then, this difference can be regarded as the width of the backlash S.

<Acquisition of Rotation Angles of Motor Corresponding to Valley Bottoms of Plurality of Valley Portions>

In the present embodiment, the rotation angle of the rotor 11 corresponding to the center of the backlash S is calculated based on the detected width of the backlash S. Specifically, a central state (that is, the center of the width of the backlash S) between the state where the backlash S is eliminated when the motor 10 is rotated in the arrow A direction and the state where the backlash S is eliminated when the motor 10 is rotated in the arrow B direction can be regarded as the center of the backlash S.

That is, a straight line L3 as the center of the backlash S passing through a center between the straight line L1 as the first estimated value and the straight line L2 as the second estimated value is acquired as the rotation angle of the rotor 11 corresponding to the center of the backlash S. That is, a slope (hereinafter referred to as a3) and segments (hereinafter referred to as b3) of the straight line L3 are calculated. The straight line L3 represents a relation between the output value of the output shaft rotation angle sensor 40 and the output value of the rotor rotation angle sensor 30 (the rotation angle of the rotor 11) corresponding to the center of the backlash S.

Then, in the present embodiment, the rotation angle of the motor 10 corresponding to the center of the backlash S is acquired based on the association between the calculated rotation angle of the rotor 11 corresponding to the center of the backlash S and the output value of the output shaft rotation angle sensor 40 corresponding to the valley bottom V of each of the valley portions 80.

Specifically, the output values of the output shaft rotation angle sensor 40 in a plurality of sections 1 (the sections 1 corresponding to the P position, the R position, the N position, and the D position) when the motor 10 rotates in the arrow A direction are acquired. In each of the plurality of sections 1, the output value of the output shaft rotation angle sensor 40 is a constant value. Specifically, the output values of the output shaft rotation angle sensor 40 corresponding to the P position, the R position, the N position, and the D position are E1, E2, E3, and E4, respectively.

Further, the output values of the output shaft rotation angle sensor 40 in a plurality of sections 4 (the sections 4 corresponding to the D position, the N position, the R position, and the P position) when the motor 10 rotates in the arrow B direction are acquired. In addition, the output value of the output shaft rotation angle sensor 40 in each of the plurality of sections 4 is a constant value. Specifically, the output values of the output shaft rotation angle sensor 40 corresponding to the D position, the N position, the R position, and the P position are E4, E3, E2, and E1, respectively. That is, the output value of the output shaft rotation angle sensor 40 in the section 1 and the output value of the output shaft rotation angle sensor 40 in the section 4 at the same shift position are substantially the same.

Then, in the straight line L3, the rotation angles of the motor 10 corresponding to the sections 1 (or the sections 4) are acquired. Specifically, rotation angles θ1, θ2, θ3, and θ4 of the motor 10 corresponding to the output values E1, E2, E3, and E4 of the output shaft rotation angle sensor 40 are acquired. As a result, the rotation angles θ1, θ2, θ3, and θ4 of the motor 10 corresponding to the valley bottoms V (the center of the backlash S) at the P position, the R position, the N position, and the D position are acquired.

Therefore, as described above, since the vertical axis in FIG. 10 represents the integrated value of the rotation angle of the motor 10 (=2π×the number of rotations of the motor 10+the rotation angle), the number of rotations of the motor 10 corresponding to each of the valley bottoms V (the center of the backlash S) at the P position, the R position, the N position, and the D position (the plurality of valley portions 81 to 84), and the rotation angle at the number of rotations are acquired.

Then, a learning result is stored into the nonvolatile storage unit 90 (see FIG. 1). Specifically, the linearly approximated first estimated value (the straight line L1), the linearly approximated second estimated value (the straight line L2), and the center of the backlash S (the straight line L3) which is a central value of the linearly approximated first estimated value and the linearly approximated second estimated value, are stored into the nonvolatile storage unit 90. Further, the output values of the output shaft rotation angle sensor 40 and the output values of the rotor rotation angle sensor 30 which correspond to the valley bottoms V of the plurality of valley portions 81 to 84, and the center of the backlash S are stored into the nonvolatile storage unit 90.

(Control Process of Avoiding Collision of Detent Spring Against Wall Portions)

Figure 12:
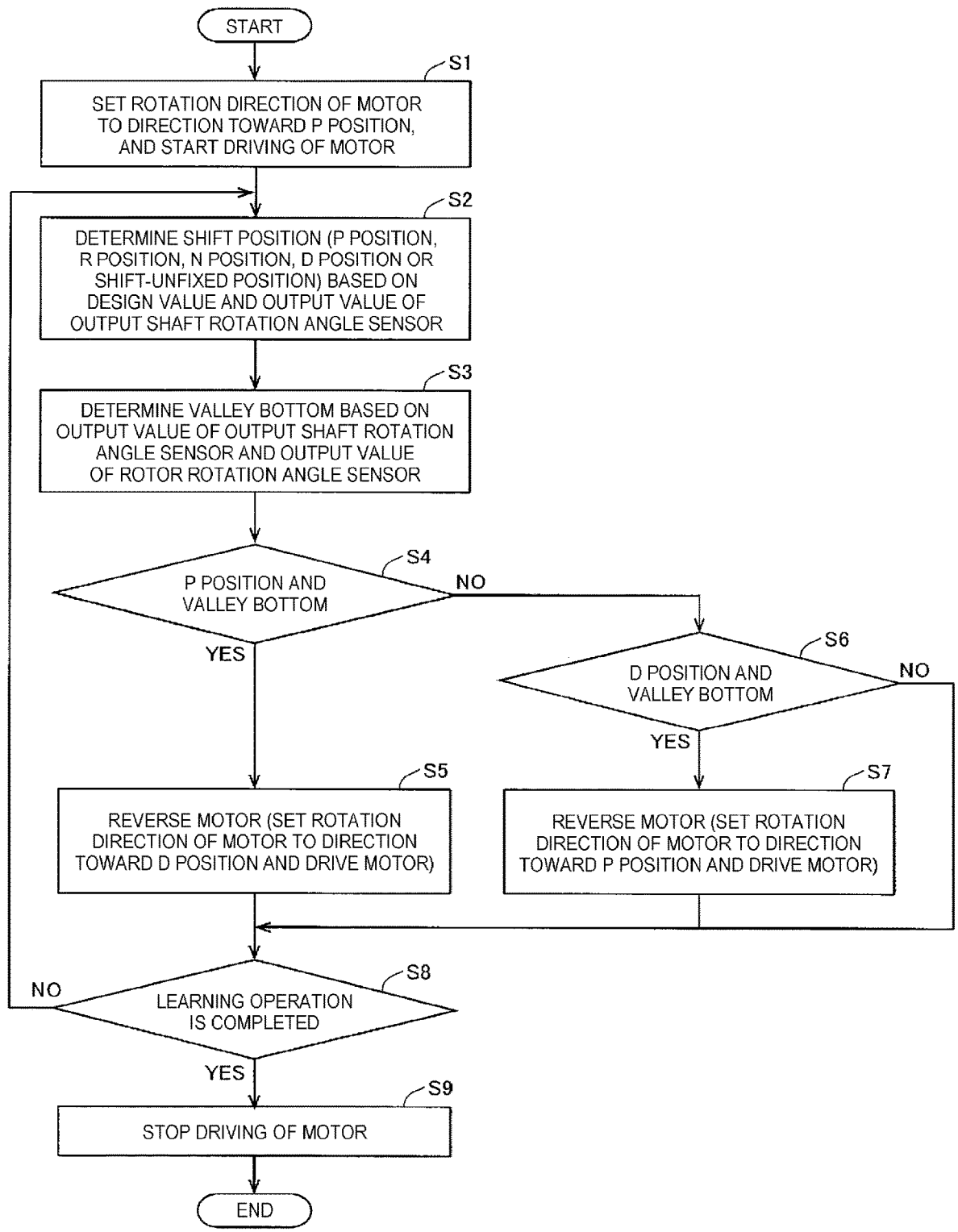
FIG. 12 is a flowchart illustrating a control process of avoiding collision of a detent spring against a wall portion, which is executed by the shift device.

The control process of avoiding the collision of the detent spring 72 against the wall portions 81a and 84a to be performed by the shift device 100 will be described with reference to FIG. 12. The control process is executed by, for example, the ECU 50 of the shift device 100. As an example, it is assumed that the movement (the turning) of the detent plate 71 is started from the valley bottom V of the valley portion 83 at the N position.

First, in step S1, the rotation direction of the motor 10 is set to the arrow B direction, and the driving of the motor 10 is started. That is, in step S1, the rotation direction of the motor 10 is set to the arrow B direction and the driving of the motor 10 (the movement of the detent plate 71) is started in order to move the detent plate 71 (the detent spring 72) from the N position to the P position. Then, the process proceeds to step S2.

Next, in step S2, a current shift position is determined based on the design value DE (see FIG. 11) and the output value of the output shaft rotation angle sensor 40. That is, in step S2, it is determined which of the P position, the R position, the N position, the D position, and the shift-unfixed position the detent plate 71 is located. Then, the process proceeds to step S3.

As illustrated in FIG. 11, the detent plate 71 being located at the P position means that specifically, the output value of the output shaft rotation angle sensor 40 is in a range of A1 to A2 (A1 or more and A2 or less) [V]. The range of A1 to A2 [V] is a range where the E1 [V] (see FIG. 8) is set as a central voltage and which has a small width around the E1 [V].

Further, as illustrated in FIG. 11, the detent plate 71 being located at the R position, the N position, and the D position means that the output value of the output shaft rotation angle sensor 40 is in a range of B1 to B2 (B1 or more and B2 or less) [V], a range of C1 to C2 (C1 or more and C2 or less) [V] and a range of D1 to D2 (D1 or more and D2 or less) [V], respectively. The range of B1 to B2 [V] is a range where the E2 [V] (see FIG. 8) is set as a central voltage and which has a small width around the E2 [V]. In addition, the range of C1 to C2 [V] is a range where the E3 [V] (see FIG. 8) is set as a central voltage and which has a small width around the E3 [V]. In addition, the range of D1 to D2 [V] is a range where the E4 [V] (see FIG. 8) is set as a central voltage and which has a small width around the E4 [V].

Next, in step S3, it is determined whether the detent plate 71 is located at the valley bottom V based on the output value of the output shaft rotation angle sensor 40 and the output value of the rotor rotation angle sensor 30. That is, in step S3, it is determined whether the detent plate 71 is located at any one of the valley bottoms V of the plurality of valley portions 81 to 84 regardless of the shift positions (the P position, the R position, the N position, the D position, and the shift-unfixed position). In short, in step S3, it is determined whether the output value of the output shaft rotation angle sensor 40 is substantially constant due to an influence of the backlash S while the motor 10 is driven and the output value of the rotor rotation angle sensor 30 changes. Then, the process proceeds to step S4.

Next, in step S4, it is determined whether the detent plate 71 is determined to be located at the P position in step S2 and whether the detent plate 71 is determined to be located at the valley bottom V in step S3. That is, in step S4, it is determined whether the detent spring 72 has a risk of colliding against the wall portion 81a when the movement of the detent plate 71 (the driving of the motor 10) in the arrow B direction is continued as it is. Then, if it is determined in step S4 that the detent plate 71 is determined to be located at the P position in step S2 and the detent plate 71 is determined to be located at the valley bottom V in step S3, the process proceeds to step S5, and if not, the process proceeds to step S6.

Next, in step S5, the rotation direction of the motor 10 is reversed from the arrow B direction to the arrow A direction. That is, in step S5, the rotation direction of the motor 10 is set to the arrow A direction, and the motor 10 is driven (the detent plate 71 is moved) in order to move the detent plate 71 from the P position toward the D position (moves away from the wall portion 81a in order to avoid the collision of the detent spring 72 against the wall portion 81a). Then, the process proceeds to step S8.

Further, in step S6, it is determined whether the detent plate 71 is determined to be located at the D position in step S2 and whether the detent plate 71 is determined to be located at the valley bottom V in step S3. That is, in step S6, it is determined whether the detent spring 72 has a risk of colliding against the wall portion 84a when the movement of the detent plate 71 (the driving of the motor 10) in the arrow A direction is continued as it is. Then, if it is determined in step S6 that the detent plate 71 is determined to be located at the D position in step S2 and the detent plate 71 is determined to be located at the valley bottom V in step S3, the process proceeds to step S7, and if not, the process proceeds to step S8.

Next, in step S7, the rotation direction of the motor 10 is reversed from the arrow A direction to the arrow B direction. That is, in step S7, the rotation direction of the motor 10 is set to the arrow B direction, and the motor 10 is driven (the detent plate 71 is moved) in order to move the detent plate 71 from the D position toward the P position (moves away from the wall portion 84*a* in order to avoid the collision of the detent spring 72 against the wall portion 84*a*). Then, the process proceeds to step S8.

Next, in step S8, it is determined whether a learning operation is completed. That is, in step S8, it is determined whether the movement of the detent plate 71 is reciprocated once between the P position and the D position. Specifically, in step S8, it is determined whether the valley bottom V (the N position) of the valley portion 83 (the N position), which is the valley bottom V of the valley portion 83 (the N position) firstly detected at the start of the driving of the motor 10 and which is in the same rotation direction (the arrow B direction) as that at the start of the driving of the motor 10, is detected again based on the output values of the rotor rotation angle sensor 30 and the output shaft rotation angle sensor 40 and the design value DE after the driving of the motor 10 is started. Then, if it is determined in step S8 that the learning operation is completed, the process proceeds to step S9, and if not, the process returns to step S2.

Next, in step S9, the driving of the motor 10 (the movement of the detent plate 71) is stopped. As described above, the learning for acquiring the rotation angles of the motor 10 corresponding to the valley bottoms V of the plurality of valley portions 81 to 84 is completed.

Effects of Embodiment

In the present embodiment, the following effects can be attained.

In the present embodiment, as described above, when the detent spring 72 is moved to pass through the plurality of valley portions 81, 82, 83, and 84, the rotation angles of the motor 10 corresponding to the valley bottoms of the plurality of valley portions 81, 82, 83, and 84 are acquired (learned) by, based on the output values of the rotor rotation angle sensor 30 and the output shaft rotation angle sensor 40, and the design value DE associated with the output value of the output shaft rotation angle sensor 40 and the shift positions, detecting the valley bottoms V of the valley portions 81 and 84 at the end portions 81*b* and 84*b* among the plurality of valley portions 81, 82, 83, and 84 and reversing the movement of the detent spring 72. Accordingly, at the time of learning, based on the output values of the rotor rotation angle sensor 30 and the output shaft rotation angle sensor 40 and the design value DE associated with the output value of the output shaft rotation angle sensor 40 and the shift positions, the valley bottoms V of the valley portions 81 and 84 (the valley portions 81 and 84 provided with the wall portions 81*a* and 84*a*) at the end portions 81*b* and 84*b* among the plurality of valley portions 81, 82, 83, and 84 can be detected, and the movement of the detent spring 72 can be reversed. Therefore, when the valley bottoms V of the valley portions 81 and 84 (the valley portions 81 and 84 provided with the wall portions 81*a* and 84*a*) at the end portions 81*b* and 84*b* are detected, the moving direction of the detent spring 72 can be changed such that the detent spring 72 moves away from the wall portions 81*a* and 84*a*. As a result, the learning can be performed without causing the detent spring 72 to collide against the wall portions 81*a* and 84*a* provided at the valley portions 81, 82, 83, and 84 at the end portions 81*b* and 84*b*. Therefore, it is possible to suppress the decrease in the durability of the transmission mechanism 120 mechanically connected to the detent plate 71, and it is possible to suppress the decrease in the positioning accuracy of the shift position.

In the present embodiment, as described above, the shift device 100 further includes the speed reduction mechanism 20 in which a predetermined amount of backlash S is provided which does not allow transmission of the driving force from the motor 10 to the detent plate 71, and which is configured to turn the detent plate 71 while reducing the rotation speed transmitted from the motor 10 side. The rotation angles of the motor 10 corresponding to the valley bottoms V of the plurality of valley portions 81, 82, 83, and 84 can be acquired by detecting the valley bottoms V of the valley portions 81, 82, 83, and 84 at the end portions 81*b* and 84*b* and reversing the movement of the detent spring 72 by detecting a state, where the driving force is not transmitted from the motor 10 to the detent plate 71 due to the backlash S, based on the output values of the rotor rotation angle sensor 30 and the output shaft rotation angle sensor 40 and the design value DE. Therefore, it is possible to keep the detent spring 72 at each of the valley bottoms V of the valley portions 81, 82, 83, and 84 of the detent plate 71 without moving the detent plate 71 with respect to the driving of the motor 10 by a distance corresponding to the predetermined amount of backlash S (play) intentionally provided in the speed reduction mechanism 20. Therefore, it is possible to learn the position of each of the valley bottoms V of the valley portions 81, 82, 83, and 84 to which the positioning portion is fitted, without applying an excessive load (an external force) to the motor 10 side or a detent spring 72 side.

In the present embodiment, as described above, the rotation angles of the motor 10 corresponding to the valley bottoms V of the plurality of valley portions 81, 82, 83, and 84 are acquired by reciprocating the detent spring 72 once between the end portions 81*b* and 84*b* on both sides among the plurality of valley portions 81, 82, 83, and 84. Therefore, since it is possible to acquire (learn) the rotation angles of the motor 10 corresponding to the valley bottoms V of the plurality of valley portions 81, 82, 83, and 84 by simply reciprocating the detent spring 72 once between the end portions 81*b* and 84*b* on both sides among the plurality of valley portions 81, 82, 83, and 84, a tact time for acquiring the rotation angles of the motor 10 corresponding to the valley bottoms V of the plurality of valley portions 81, 82, 83, and 84 can be shortened.

In the present embodiment, as described above, when the detent spring 72 is moved to pass through the plurality of valley portions 81, 82, 83, and 84, in a case where, after the driving of the motor 10 is started, the valley bottom V of one of the valley portions 80, which is the valley bottom of the valley portion 80 detected at the start of the driving of the motor 10 and which is in the same rotation direction as that at the start of the driving of the motor 10, is detected again based on the output values of the rotor rotation angle sensor 30 and the output shaft rotation angle sensor 40 and the design value DE, it is determined that the rotation angles of the motor 10 corresponding to the valley bottoms of the plurality of valley portions 81, 82, 83, and 84 are acquired, and the driving of the motor 10 is stopped. Accordingly, the driving of the motor 10 can be stopped in the case where the valley bottom V of the valley portion 80, which is the valley bottom V of the valley portion 80 detected at the start of the driving of the motor 10 and which is in the same rotation direction as that at the start of the driving of the motor 10, is detected again after the driving of the motor 10 is started, and thus it is possible to reliably detect that the detent spring 72 reciprocates once between the end portions 81*b* and 84*b* on both sides among the plurality of valley portions 81, 82, 83, and 84.

In the present embodiment, as described above, the plurality of valley portions 81, 82, 83, and 84 include the parking position, the reverse position, the neutral position and the drive position as the shift positions in order of the parking position, the reverse position, the neutral position, and the drive position from the one end portion 81b toward the other end portion 84b, and the rotation angles of the motor 10 corresponding to the parking position, the reverse position, the neutral position, and the drive position are acquired while the detent spring 72 is being moved to pass through the parking position, the reverse position, the neutral position, and the drive position in order. Therefore, it is possible to reverse the movement of the detent spring 72 at the parking position and the drive position located at the end portions 81b and 84b, and to acquire (learn) the rotation angles of the motor 10 corresponding to the parking position, the reverse position, the neutral position, and the drive position.

In the present embodiment, as described above, at another position of the detent plate 71 excluding the four shift positions including the parking position, the reverse position, the neutral position, and the drive position, it is detected that detent spring 72 is located at the shift-unfixed position where the design value DE is not associated with the output value of the output shaft rotation angle sensor 40. Therefore, it is possible to detect not only that the detent spring 72 is located at any one of the parking position, the reverse position, the neutral position, and the drive position, but also that the detent spring 72 is located at a position (the shift-unfixed position) that does not correspond to all of the four shift positions including the parking position, the reverse position, the neutral position, and the drive position. As a result, since the position of the detent spring 72 can be detected in more detail, it is possible to acquire (learn) the rotation angles of the motor 10 corresponding to the shift positions more accurately.

In the present embodiment, as described above, the wall portions 81a and 84a that prevent the detent spring 72 from moving beyond the valley portions 81 and 84 at the end portions 81b and 84b are respectively provided at the valley portions 81 and 84 at the end portions 81b and 84b, and the movement of the detent spring 72 is reversed such that the detent spring 72 does not collide against the wall portions 81a and 84a. Therefore, since the movement of the detent spring 72 can be reversed such that the detent spring 72 does not collide against the wall portions 81a and 84a, it is possible to more reliably prevent the detent spring 72 from colliding against the wall portions 81a and 84a.

In the present embodiment, as described above, the design value DE includes an angle map that indicates the relation between the shift position and the rotation angle of the detent plate 71 corresponding to the output value of the output shaft rotation angle sensor 40. Therefore, it is possible to easily acquire (learn) the rotation angles of the motor 10 corresponding to the valley bottoms V of the plurality of valley portions 81, 82, 83, and 84 based on the angle map indicating the relation between the shift position and the rotation angle of the detent plate 71 corresponding to the output value of the output shaft rotation angle sensor 40.

Modification

The embodiment disclosed here should be considered as illustrative and non-restrictive in all respects. The scope of the invention is shown by the scope of claims rather than the description of the above embodiment, and further includes all changes (modifications) within equivalent meaning and scope to claims.

For example, although an example in which the shift device has four shift positions has been described in the above embodiment, the invention is not limited thereto. In the invention, the shift device may have two, three, or five or more shift positions.

Further, in the embodiment described above, the example in which the first estimated value and the second estimated value are calculated based on linear approximation has been described, but the invention is not limited thereto. For example, the first estimated value and the second estimated value may be calculated by a method (polynomial approximation or the like) other than the linear approximation.

In the embodiment described above, the example in which the predetermined amount of backlash S is provided in advance between the intermediate gear 21 and the intermediate gear 22 illustrated in FIG. 4 has been described, but the invention is not limited thereto. The invention can also be applied to a case where the predetermined amount of backlash S is not provided between the intermediate gear 21 and the intermediate gear 22 (a case where only an unintended backlash such as an assembling error occurs).

Further, in the embodiment described above, the example in which the shift device is applied as a shift device for an automobile, but the invention is not limited thereto. In the invention, the shift device may be applied as a shift device for an electric tram instead of an automobile.

Further, in the embodiment described above, the example in which the learning is ended when the detent spring is reciprocated once between the end portions on both sides among the plurality of valley portions has been described, but the invention is not limited thereto. In the invention, the learning may be ended after the detent spring is reciprocated a plurality of times between the end portions on both sides among the plurality of valley portions.

In addition, in the embodiment described above, the example in which the lever type operation unit for shift switching is provided in the vehicle has been described, but the invention is not limited thereto. In the invention, for example, a button type operation unit for shift switching may be provided in the vehicle.

REFERENCE SIGNS LIST 10 motor
11 rotor
12 stator
20 speed reduction mechanism
30 rotor rotation angle sensor
40 output shaft rotation angle sensor
71 detent plate (shift switching member)
72 detent spring (positioning member)
80, 81, 82, 83, 84 valley portion
81b, 84b end portion (among a plurality of valley portions)
100 shift device
110 vehicle
DE design value
S backlash
V valley bottom

The invention claimed is:
1. A shift device to be mounted on a vehicle, comprising:
a shift switching member including a plurality of valley portions provided to correspond to shift positions;

a positioning member configured to, in a state of being fitted in any one of the plurality of valley portions of the shift switching member, establish a corresponding one of the shift positions;

a motor configured to drive the shift switching member and including a rotor and a stator;

a rotor rotation angle sensor configured to detect a rotation angle of the rotor; and an output shaft rotation angle sensor configured to detect a rotation angle of the shift switching member, wherein when the positioning member is moved to pass through the plurality of valley portions, the rotation angle of the motor corresponding to a valley bottom of each of the plurality of valley portions is acquired by, based on output values of the rotor rotation angle sensor and the output shaft rotation angle sensor, and a design value associated with the output value of the output shaft rotation angle sensor and the shift positions, detecting the valley bottom of the valley portion at an end portion among the plurality of valley portions and reversing a turning direction of the positioning member, wherein the plurality of valley portions include a parking position, a reverse position, a neutral position, and a drive position as the shift positions in order of the parking position, the reverse position, the neutral position and the drive position from one end portion toward the other end portion, wherein the rotation angle of the motor corresponding to each of the parking position, the reverse position, the neutral position, and the drive position is acquired while the positioning member is being moved to pass through the parking position, the reverse position, the neutral position, and the drive position in order, and wherein at another position of the shift switching member excluding the four shift positions including the parking position, the reverse position, the neutral position, and the drive position, it is detected that the positioning member is located at a shift-unfixed position at which the design value is not associated with the output value of the output shaft rotation angle sensor.

2. The shift device according to claim 1, further comprising:

a speed reduction mechanism in which a predetermined amount of backlash is provided which does not allow transmission of a driving force from the motor to the shift switching member, the speed reduction mechanism being configured to turn the shift switching member while reducing a rotation speed transmitted from a motor side, wherein the rotation angle of the motor corresponding to the valley bottom of each of the plurality of valley portions is acquired by detecting the valley bottom of the valley portion at the end portion and reversing the movement of the positioning member by detecting a state, where the driving force is not transmitted from the motor to the shift switching member due to the backlash, based on the output values of the rotor rotation angle sensor and the output shaft rotation angle sensor and the design value.

3. The shift device according to claim 1, wherein the rotation angle of the motor corresponding to the valley bottom of each of the plurality of valley portions is acquired by reciprocating the positioning member once between the end portions on both sides among the valley portions.

4. The shift device according to claim 3, wherein when the positioning member is moved to pass through the plurality of valley portions, in a case where, after driving of the motor is started, the valley bottom of the valley portion, which is the valley bottom of the valley portion detected at the start of the driving of the motor and which is in the same rotation direction as that at the start of the driving of the motor, is detected again based on the output values of the rotor rotation angle sensor and the output shaft rotation angle sensor and the design value, it is determined that the rotation angle of the motor corresponding to the valley bottom of each of the plurality of valley portions is acquired, and the driving of the motor is stopped.

5. A shift device to be mounted on a vehicle, comprising:

a shift switching member including a plurality of valley portions provided to correspond to shift positions;

a positioning member configured to, in a state of being fitted in any one of the plurality of valley portions of the shift switching member, establish a corresponding one of the shift positions;

a motor configured to drive the shift switching member and including a rotor and a stator;

a rotor rotation angle sensor configured to detect a rotation angle of the rotor; and an output shaft rotation angle sensor configured to detect a rotation angle of the shift switching member, wherein when the positioning member is moved to pass through the plurality of valley portions, the rotation angle of the motor corresponding to a valley bottom of each of the plurality of valley portions is acquired by reversing a turning direction of the positioning member between end portions on both sides among the plurality of valley portions based on output values of the rotor rotation angle sensor and the output shaft rotation angle sensor, and a design value associated with the output value of the output shaft rotation angle sensor and the shift positions, wherein the plurality of valley portions include a parking position, a reverse position, a neutral position, and a drive position as the shift positions in order of the parking position, the reverse position, the neutral position and the drive position from one end portion toward the other end portion, wherein the rotation angle of the motor corresponding to each of the parking position, the reverse position, the neutral position, and the drive position is acquired while the positioning member is being moved to pass through the parking position, the reverse position, the neutral position, and the drive position in order, and wherein at another position of the shift switching member excluding the four shift positions including the parking position, the reverse position, the neutral position, and the drive position, it is detected that the positioning member is located at a shift-unfixed position at which the design value is not associated with the output value of the output shaft rotation angle sensor.

* * * * *